US 9,916,411 B2

(12) United States Patent
Nifong et al.

(10) Patent No.: US 9,916,411 B2
(45) Date of Patent: Mar. 13, 2018

(54) NEGATIVE PLANE USAGE WITH A VIRTUAL HIERARCHICAL LAYER

(71) Applicant: Synopsys, Inc., Mountain View, CA (US)

(72) Inventors: Gary B Nifong, Durham, NC (US); Jun Chen, Cary, NC (US); Karthikeyan Muthalagu, Morrisville, NC (US); James Lewis Nance, Raleigh, NC (US)

(73) Assignee: Synopsys, Inc., Mountain View, CA (US)

( * ) Notice: Subject to any disclaimer, the term of this patent is extended or adjusted under 35 U.S.C. 154(b) by 135 days.

(21) Appl. No.: 14/713,488

(22) Filed: May 15, 2015

(65) Prior Publication Data

US 2015/0339426 A1 Nov. 26, 2015

Related U.S. Application Data

(60) Provisional application No. 62/002,808, filed on May 24, 2014, provisional application No. 62/006,069, filed on May 31, 2014, provisional application No. 62/006,657, filed on Jun. 2, 2014, provisional application No. 62/006,083, filed on May 31, 2014, provisional application No. 62/006,607, filed on Jun.
(Continued)

(51) Int. Cl.
*G06F 17/50* (2006.01)

(52) U.S. Cl.
CPC .......... *G06F 17/5081* (2013.01); *G06F 17/50* (2013.01); *G06F 17/5009* (2013.01); *G06F 17/5072* (2013.01); *G06F 17/5068* (2013.01); *G06F 2217/12* (2013.01); *Y02P 90/265* (2015.11)

(58) Field of Classification Search
None
See application file for complete search history.

(56) References Cited

U.S. PATENT DOCUMENTS

| 5,281,558 A | * | 1/1994 | Bamji | ................. G06F 17/5081 438/129 |
| 5,309,371 A | * | 5/1994 | Shikata | ............... G06F 17/5072 716/121 |

(Continued)

OTHER PUBLICATIONS

U.S. Appl. No. 14/604,694, Non-Final Office Action dated Nov. 19, 2015.
(Continued)

*Primary Examiner* — Leigh Garbowski
(74) *Attorney, Agent, or Firm* — Alston & Bird LLP

(57) ABSTRACT

A virtual hierarchical layer (VHL) is constructed for a semiconductor design in order to reduce the computational requirement of design rules checking (DRC) and design rules for manufacture (DRM) procedures. In order to form the VHL, a negative plane is created. A cell and multiple instances of the cell are then identified in the semiconductor design and polygons which overlap the cell and its instances are determined. The polygons are pushed into the negative plane to create holes in the plane. Shapes overlapping other instances of the cell which fall onto holes in the solid virtual cell plane are ignored. The resulting holed solid virtual cell plane can then be inverted to create a VHL to be used for design simulation and verification.

17 Claims, 23 Drawing Sheets

Related U.S. Application Data 2, 2014, provisional application No. 62/006,092, filed on May 31, 2014.

(56) References Cited

U.S. PATENT DOCUMENTS

| | | | |
|---|---|---|---|
| 5,493,510 A * | 2/1996 | Shikata | G06F 17/5072 |
| | | | 716/123 |
| 5,528,508 A * | 6/1996 | Russell | G06F 17/5081 |
| | | | 716/52 |
| 5,559,718 A * | 9/1996 | Baisuck | G06F 17/5081 |
| | | | 716/52 |
| 6,009,250 A | 12/1999 | Ho et al. | |
| 6,009,251 A | 12/1999 | Ho et al. | |
| 6,011,911 A | 1/2000 | Ho et al. | |
| 6,035,113 A * | 3/2000 | Gerber | H01J 37/3023 |
| | | | 716/53 |
| 6,047,116 A * | 4/2000 | Murakami | H01J 37/3026 |
| | | | 716/54 |
| 6,275,971 B1 | 8/2001 | Levy | |
| 6,289,412 B1 * | 9/2001 | Yuan | G06F 17/5081 |
| | | | 703/14 |
| 6,363,516 B1 | 3/2002 | Cano et al. | |
| 6,543,039 B1 | 4/2003 | Watanabe | |
| 6,629,304 B1 * | 9/2003 | Gasanov | G06F 17/5072 |
| | | | 716/119 |
| 6,730,463 B2 | 5/2004 | Heissmeier et al. | |
| 6,845,494 B2 * | 1/2005 | Burks | G06F 17/5022 |
| | | | 716/108 |
| 6,886,148 B2 * | 4/2005 | Solomon | G06F 17/5068 |
| | | | 716/139 |
| 6,969,837 B2 | 11/2005 | Ye | |
| 7,103,863 B2 * | 9/2006 | Riepe | G06F 17/5045 |
| | | | 716/113 |
| 7,146,583 B1 | 12/2006 | Sun et al. | |
| 7,149,989 B2 | 12/2006 | Lakshmanan | |
| 7,155,440 B1 * | 12/2006 | Kronmiller | G06F 17/5068 |
| | | | 707/797 |
| 7,415,694 B2 * | 8/2008 | Mayhew | G03F 1/30 |
| | | | 430/396 |
| 7,418,693 B1 | 8/2008 | Gennari et al. | |
| 7,461,359 B1 | 12/2008 | Nequist | |
| 7,847,937 B1 | 12/2010 | Bevis | |
| 7,873,204 B2 | 1/2011 | Wihl et al. | |
| 7,873,585 B2 | 1/2011 | Izikson | |
| 7,984,395 B2 * | 7/2011 | Cork | G03F 1/36 |
| | | | 716/53 |
| 8,019,561 B1 | 9/2011 | Sahrling | |
| 8,453,091 B1 | 5/2013 | Rao et al. | |
| 8,539,416 B1 | 9/2013 | Rossman et al. | |
| 8,799,833 B2 | 8/2014 | Wann et al. | |
| 9,405,879 B2 * | 8/2016 | Wang | G06F 17/5081 |
| 9,454,635 B2 * | 9/2016 | Oberai | G06F 17/5081 |
| 9,740,811 B2 * | 8/2017 | Chen | G06F 17/5072 |
| 9,740,812 B2 * | 8/2017 | Nance | G06F 17/5072 |
| 2002/0046392 A1 | 4/2002 | Ludwig et al. | |
| 2003/0163795 A1 | 8/2003 | Morgan et al. | |
| 2003/0229882 A1 | 12/2003 | Ludwig et al. | |
| 2005/0076316 A1 | 4/2005 | Pierrat et al. | |
| 2005/0183053 A1 * | 8/2005 | Ishizuka | G06F 17/5068 |
| | | | 716/122 |
| 2005/0235245 A1 | 10/2005 | Kotani et al. | |
| 2006/0136856 A1 | 6/2006 | Tang et al. | |
| 2008/0046849 A1 | 2/2008 | Choi | |
| 2008/0127016 A1 | 5/2008 | Ishikawa | |
| 2008/0155485 A1 | 6/2008 | Lin et al. | |
| 2008/0244493 A1 | 10/2008 | Finkler | |
| 2009/0089720 A1 | 4/2009 | Nequist | |
| 2009/0210845 A1 | 8/2009 | Malgioglio et al. | |
| 2009/0216450 A1 | 8/2009 | Sakamoto et al. | |
| 2009/0287440 A1 | 11/2009 | Kulkarni | |
| 2009/0310870 A1 | 12/2009 | Monkowski | |
| 2010/0238433 A1 | 9/2010 | Lange et al. | |
| 2010/0251202 A1 | 9/2010 | Pierrat | |
| 2014/0215422 A1 | 7/2014 | Juneja et al. | |
| 2015/0089457 A1 | 3/2015 | Agarwal et al. | |
| 2015/0213189 A1 | 7/2015 | Oberai | |
| 2015/0339430 A1 * | 11/2015 | Nifong | G06F 17/5072 |
| | | | 716/112 |
| 2015/0339431 A1 | 11/2015 | Chen et al. | |
| 2015/0339432 A1 | 11/2015 | Nance et al. | |
| 2015/0339433 A1 * | 11/2015 | Nifong | G06F 17/5072 |
| | | | 716/106 |
| 2015/0339434 A1 * | 11/2015 | Nifong | G06F 17/5072 |
| | | | 716/112 |

OTHER PUBLICATIONS

U.S. Appl. No. 14/604,694, Notice of Allowance dated Jun. 2, 2016.
U.S. Appl. No. 14/634,695, Final Office Action dated Dec. 14, 2016.
U.S. Appl. No. 14/634,695, Non-Final Office Action dated Jul. 1, 2016.
U.S. Appl. No. 14/673,064, Final Office Action dated Sep. 26, 2016.
U.S. Appl. No. 14/673,064, Non-Final Office Action dated Jun. 8, 2016.
U.S. Appl. No. 14/673,064, Notice of Allowance dated Nov. 14, 2016.
U.S. Appl. No. 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Nov. 8, 2016.
U.S. Appl. No. 14/713,716, Final Office Action dated Jan. 9, 2017.
U.S. Appl. No. 14/713,716, Non-Final Office Action dated Aug. 11, 2016.
U.S. Appl. No. 14/719,996, Non-Final Office Action dated Aug. 26, 2016.
U.S. Appl. No. 14/719,996, Notice of Allowance dated Nov. 16, 2016.
U.S. Appl. No. 14/634,695, Non-Final Office Action dated Jul. 14, 2017.
U.S. Appl. No. 14/673,064, Notice of Allowance dated Mar. 8, 2017.
U.S. Appl. No. 14/673,064, Notice of Allowance dated Apr. 26, 2017.
U.S. Appl. No. 14/673,709, Notice of Allowance dated Mar. 2, 2017.
U.S. Appl. No. 14/673,709, Notice of Allowance dated Apr. 12, 2017.
U.S. Appl. No. 14/713,716, Non-Final Office Action dated Aug. 10, 2017.
U.S. Appl. No. 14/719,996, Notice of Allowance dated Mar. 15, 2017.
U.S. Appl. No. 14/719,996, Notice of Allowance dated Jun. 5, 2017.

* cited by examiner

NEGATIVE PLANE USAGE WITH A VIRTUAL HIERARCHICAL LAYER

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. Each of the foregoing applications are hereby incorporated by reference in their entirety.

FIELD OF ART

This application relates generally to semiconductor circuit design and more particularly to physical verification of semiconductor designs and negative plane usage with a virtual hierarchical layer.

BACKGROUND

The design process for complex modern integrated circuits (ICs) involves many different steps to help manage the complexity and produce an IC that functions as intended. ICs can contain many millions, or even billons of transistors and other electronic structures such as resistors, capacitors, diodes, and interconnecting conductors; therefore, managing the complexity of the ICs is crucial to creating electronic designs that operate as planned. One of the steps in the design process of an IC is the physical verification process, which is typically highly automated. The physical verification process for an integrated circuit (IC) is a design step taken by semiconductor manufacturers before commencing the fabrication of an IC. In order to be able to check a design, semiconductor foundries first define a set of design rules for manufacturing (DRM) for IC designers, which, when followed, ensure successful manufacture and high yield of a design during the fabrication process. The DRM provide a benchmark against which the design can be tested. The DRM are defined as a set of geometric relationships between manufacturing layers, layers which in turn are used to create an IC. A physical design layout can include hundreds of layers used during the fabrication process to create transistors and electrical interconnect in the IC. The semiconductor process has grown in complexity and a physical design layout has to adhere to thousands of design rules before a design can be successfully fabricated. Use of a design rule checking (DRC) physical verification tool is an industry standard process for implementing the semiconductor's DRM.

The DRM can define many different parameters—such as width, spacing, angle, enclosure, density and electrical connectivity rules for design layers—which in turn are translated into a DRC runset. A DRC runset is defined as set of DRC operations that verify the required DRM rules. A DRC tool provides a set of operations, or commands, from which a designer selects and combines to form sequence of DRC commands to satisfy each DRM rule. The complexity of modern DRM rules means that a DRC runset with 20,000 or more DRC commands is often required to verify technology nodes smaller than 28 nanometers (nm). Modern DRC physical verification tools have a large suite of geometric and electrical commands to effectively implement the complex DRM rules. Many of these geometric and electrical commands result in the implementation of a unique algorithm that is not shared between individual commands, thus resulting in a very complex DRC tool with many algorithms selected.

Large ICs are typically built using a hierarchical method that begins with the creation of small child cells which are in turn combined into larger parent cells, which are then successively used to build larger and larger cells to create an IC hierarchical design. The hierarchal nature of the design allows physical verification tools to selectively access portions of the design in an efficient manner, a necessity in processing cutting-edge, extremely large designs. Various forms of flattening processes present an alternative to hierarchical processing, but the flattening processes can result in very large increases in processing time and are often not feasible for design verification.

SUMMARY

A virtual hierarchical layer (VHL) can be constructed for a semiconductor design in order to reduce the computational requirement of design rules checking (DRC) and design rules for manufacturing (DRM) procedures. In order to form the VHL, a negative plane is created. A cell and multiple instances of the cell are then identified in the semiconductor design and polygons which overlap the cell and its instances are determined. The polygons are pushed into the negative plane to create holes in the plane. Shapes overlapping other instances of the cell which fall onto holes in the solid virtual cell plane are ignored. The resulting holed solid virtual cell plane can then be inverted to create a VHL to be used for design simulation and verification. A computer-implemented method for design analysis is disclosed comprising: creating a solid virtual cell plane based on a semiconductor design including a plurality of cells and a plurality of design levels; identifying a cell and multiple instances of the cell from the plurality of cells; determining, for the multiple instances, polygons which overlap the cell; pushing a polygon from the polygons, which were determined, into the solid virtual cell plane to create a hole in the solid virtual cell plane; and ignoring further shapes that fall within the hole. The method can further include pushing a second polygon from the polygons into the solid virtual cell plane to create a second hole in the solid virtual cell plane wherein the hole and the second hole comprise holes in the solid virtual cell plane. In embodiments, the method further comprises pushing further polygons, from the polygons, onto the solid virtual cell plane to create more holes in the solid virtual cell plane.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
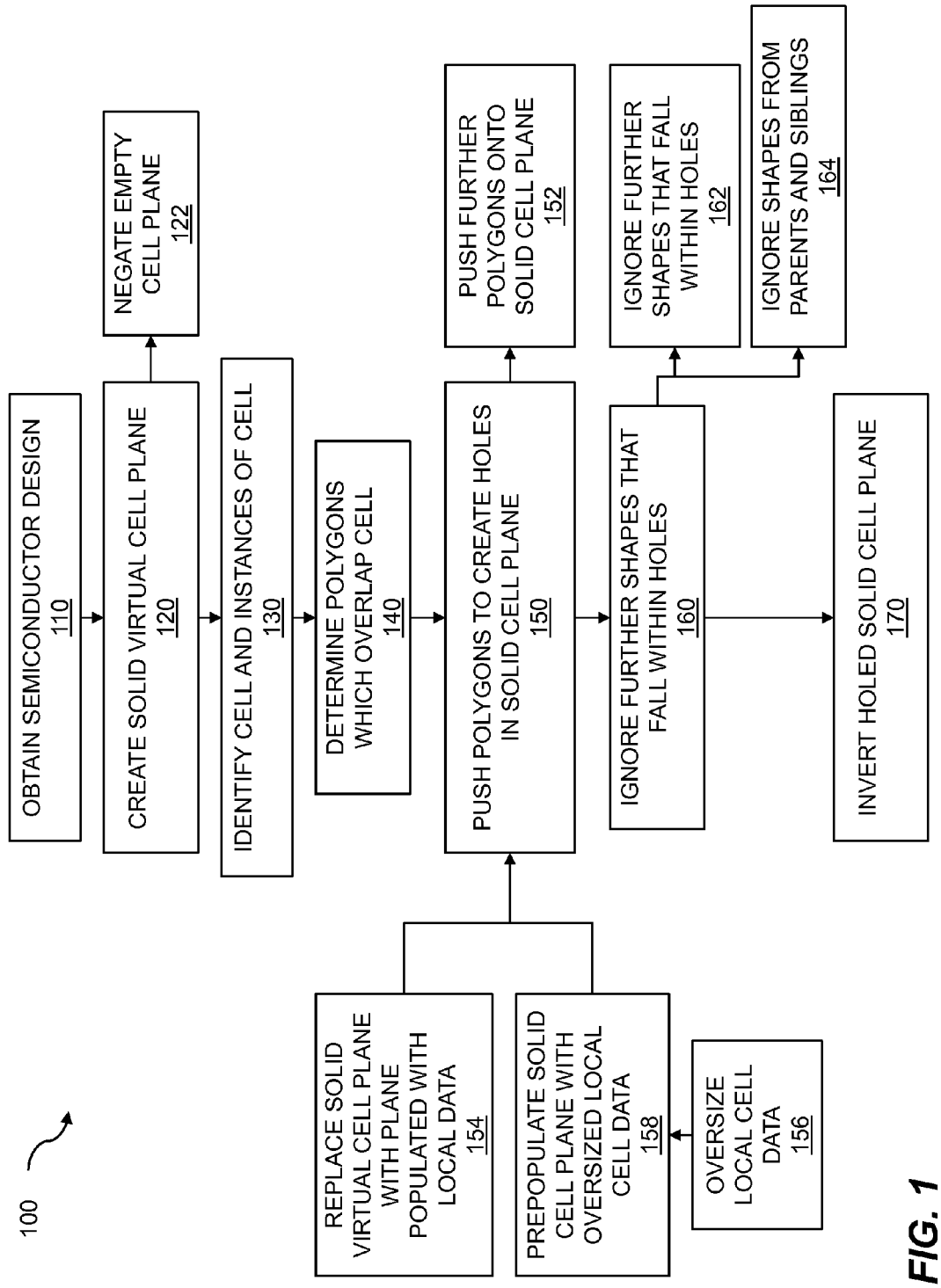
FIG. 1 is a flow for a negative plane VHL optimizer.

A virtual hierarchical layer (VHL) can be a useful structure for various tools used in the design and verification of the electronic design of an integrated circuit. The VHL can be created in various ways, but in some embodiments, as described herein, a solid virtual cell plane is created that corresponds to the boundary of the cell to be represented by the VHL. Polygons that overlap the instances of the cell in the electronic design are determined. The polygons can be found in the parent and sibling cells of the cell instances. The overlapping polygons are then pushed into the solid virtual cell plane to create holes in the solid virtual cell plane. If a polygon, or at least the portion of the polygon that overlaps the cell, falls within an existing hole in the solid virtual cell plane, the polygon or portion of the polygon that falls with the existing hole is ignored to reduce the computational requirements of creating the VHL. Once the overlapping polygons have been processed, the holed solid virtual cell plane can be inverted to create the VHL for the cell.

Hierarchical physical verification of an integrated circuit (IC) is a complex process due to a multitude of hierarchical design styles that are created by IC design companies and other IC industry tools. The different design styles often result in extremely complex designs many levels deep and containing billions of cells and polygons overlapping each other throughout the hierarchy. In many verification methods, a hierarchical verification tool collapses the inefficient cell hierarchies and merges duplicate polygons to build a new hierarchy for the tool's individual command algorithms. Once the hierarchical tool builds its new hierarchy, then the layers stored at various levels of the newly-built hierarchy are processed in relation to each other based on the definition of the design rules and the unique geometric algorithms needed to implement the design rules. For example, a DRM rule for a certain IC can require verification to be performed by executing a sequence of commands (algorithms) in a DRC runset, with each algorithm in the sequence cycling through proximal layers in the hierarchy to produce a hierarchical result which then feeds subsequent commands until the DRM rule is satisfied. An algorithm can have many optimizations which have been designed to avoid flattening the algorithm's result (output layer). Without these algorithmic optimizations, hierarchical data flattening causes the DRC algorithms to lose flexibility in processing by forcing cell data into ever larger chunks and creating extra processing time for the current algorithm and subsequent algorithms in the DRM rule.

Some hierarchical DRC methods are dependent on having the majority of the IC design layers loaded in memory before beginning the hierarchical algorithmic cycles that perform geometric operations on design data throughout the hierarchy. A hierarchical DRC method that loads an entire design layer has the advantage of having all of the instantiated cell data available in machine memory while cycling the geometric shapes throughout the hierarchy, which can result in reduced algorithm complexity. The implementation of such a hierarchical algorithm involves cycling design layers through the hierarchy searching for algorithmic interactions of geometric shapes. The hierarchical cycling is typically performed as either single-layer cycling, dual-layer cycling, or for some complex algorithms, N-layer cycling. As the layer count increases for a hierarchical algorithm, so does the memory requirement, which becomes problematic for larger and larger designs. In fact, given the exploding size of modern IC designs, loading an entire design layer into memory requires more memory than is feasible.

In response to the massive memory requirement of loading an entire layer, several hierarchical DRC methods load only partial layers into memory, which reduces storage requirements for the hierarchical algorithms but increases algorithmic complexity and data loading time. For example, data loading time increases if all the layer data of a cell is not able to be kept in memory and the data must be reloaded every time one of the cell's multiple instantiations interacts with a hierarchical geometric shape being examined. Additionally, reloading the interacting data many times becomes a significant CPU performance issue. For example, if cell A is instantiated multiple times in a hierarchical design, and cell A's data has not been pre-loaded into memory, then every time a hierarchical layer's polygon is cycled through the hierarchy and interacts with an instantiation of cell A, cell A's data would have to be reloaded dynamically from the disk, resulting in significant CPU I/O. As the alternative method of loading the entire design layer into machine memory has already been mentioned as infeasible given the increasing complexity and decreasing node size of modern semiconductor designs, virtual hierarchical layers are herein presented as an alternative. Virtual hierarchical layers eliminate dynamic cell reloading, eliminate the need to load an entire IC design layer into memory, and provide a mechanism for cell-level, bottom-up algorithms for processing hierarchical layers.

Current hierarchical DRC methodologies typically exhibit a performance tradeoff between memory consumption and dynamic data load time. The Virtual Hierarchical Layer (VHL) described in U.S. patent application "Virtual Hierarchical Layer Usage" Ser. No. 14/634,695 filed Feb. 27, 2015, which is hereby incorporated by reference in its entirety, describes a method to reduce both memory and data load time by providing a bottom up cell-level processing technique. A VHL provides a snapshot of the hierarchical overlapping of shapes for a particular cell in a semiconductor design. U.S. patent applicationp "Virtual Hierarchical Layer Patterning" Ser. No. 14/673,064 filed Mar. 30, 2015, which is hereby incorporated by reference in its entirety, describes a particular type of optimized virtual hierarchical layer (VHL) called a virtual hierarchical layer identical (VHLi). A VHLi includes geometric shapes that have the property of conveying identical layer patterns which encompass the global hierarchical information for all instances of an integrated circuit (IC) design cell. Additionally, methods of compressing VHL files are described in U.S. patent applicationp "Virtual Cell Model Geometry Compression" Ser. No. 14/673,709 filed Mar. 30, 2015, which is hereby incorporated by reference in its entirety. Compression of the VHL data can reduce the memory footprint and computational resources required for the DRC process.

Embodiments of the VHL create a hierarchical geometric layer for the purpose of performing an efficient hierarchical DRC process for the verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information is collected by finding any geometric shape not contained by the cell (i.e. not in the current cell or in any of its descendants) that is overlapping any hierarchical placement of the current cell. The obtained hierarchical information is then used to compute the VHL. To gather the necessary geometric information regarding overlaps, all cells in the hierarchy can be processed against the current cell's boundary. A two-step procedure is used for the hierarchical information propagation in some embodiments. First, it is determined whether or not the cell being processed can overlap with the current cell. Then, if there is a potential overlap, the geometric shapes in the cell under examination are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell are collected for the VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed are collected for the VHL generation. Some embodiments can check to see if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in the indirect sibling cell that overlap with the current cell are collected for the VHL generation.

4) If the cell being processed is the direct descendant of the current cell, none of its data is collected for the VHL generation.

Once the hierarchical information has been collected, the VHL is calculated for the cell. Because the previous described procedures collect geometric shapes from other cells of the hierarchy which can have various placement orientations with respect to current cell, each collected shape is transformed to reflect its geometric position relative to the placement of the current cell when the overlap occurs. The process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell is stored as a shape in the VHL. In this way, related shapes are merged and form the VHL, which in turn provides a snapshot of the totality of the hierarchical overlapping for the cell.

The embodiment described above generates VHL information for each cell only within its cell boundary. For example, if a geometric shape only abuts one placement of a cell, the shape will not show up in the VHL for the cell. Since it is important for some DRC algorithms to know the information surrounding the cell, another embodiment of the shape generation generates VHL shapes for an additional area surrounding the cell boundary. This second embodiment collects shapes in the same way as the previous embodiment, but instead of the original cell boundary, an oversized cell boundary (a virtual boundary) is used for the VHL calculation.

In embodiments where an oversized virtual boundary is used, the VHL is computed from collecting the hierarchical geometric shapes overlapping a cell's virtual boundary instead of the cell's actual borders. In this case, the VHL includes the accumulation of the data comprising the overlapping shapes that are pushed into a cell's virtual boundary and then merged into complex geometric shapes. The virtual boundary can include a cell's merged layer boundaries plus an additional cell margin referred to as an ambit. The ambit area can be defined as a ring-shaped area extended outside the original cell boundary created by extending the cell boundary by a small value known as the ambit value. Creating an ambit can also be referred to as oversizing the cell. In embodiments, hierarchical data that overlaps the oversized current cell is pushed into the virtual boundary, with the overlapping data pushed from parent cells and sibling cells into the current cell. Similarly, hierarchical data that does not overlap the current cell boundary but does overlap the ambit portion is also pushed into the virtual boundary. As a result, the geometric shapes overlapping the ambit extension area can be collected, and, along with the shapes overlapping the cell's actual boundary, can be computed into the complete VHL for the cell. In this way, hierarchical information on potentially interacting shapes for a cell is stored in the VHL, even if the shapes are slightly outside of the cell's boundaries.

Some embodiments also include an apparatus that executes VHL hierarchical algorithms as independent cell-level processes. A VHL allows the cell-level processes to accomplish cell-level data processing in the cell without flattening data out of the cell. The performance of cell-level data processing for each VHL algorithm eliminates the need for reloading data and limits memory consumption, since the entire layer hierarchy is not loaded into memory. In an additional embodiment, a single cell is processed, start to finish, by an instance of the VHL cell-level process, which allows for significant parallelization and multi-threading across all cells in an IC Design.

A DRC algorithm that uses a VHL takes in the pregenerated VHL shapes together with the input data layers and performs cell-level geometric operations. The creation of the VHL is a separate process that occurs before the DRC algorithms begin. Existing DRC tools acquire hierarchical information as the DRC algorithms are cycling on the hierarchical geometric shapes, thus the collected information in the VHL can be fed in to existing DRC tools. A VHL is independent from any particular DRC algorithm; one VHL is not limited to use by a specific DRC algorithm. Thus, if two DRC algorithms are performed on the same input data layers, they can share the same VHL. The sharing and reuse of the VHL also provides efficiency and flexibility for the implementation of DRC algorithms.

The virtual hierarchical layer (VHL) of a cell contains global hierarchical information about the cell, with the global hierarchical information representing an accumulation of the overlapping data from the selected cell's parent and sibling cells. Geometric shapes from parents and siblings get pushed into the current cell's boundary where they are merged into a set of VHL shapes. The VHL gets generated for all commands in the runset and the commands use the VHL shapes to process the cells in the hierarchy in a bottom-up fashion. The VHL algorithm's performance is heavily dependent on the number and geometric complexity of the VHL shapes. Embodiments described herein provide faster methods of creating the VHL shapes and the generation of simpler geometrical shapes for the VHL.

In embodiments, a negative plane, which can also be called a solid virtual cell plane, is used to receive the geometric shapes pushed down from the parent and sibling cells. In some embodiments, the current cell's local data is used as a reference to prepopulate the negative plane with holes before receiving the hierarchical geometric shapes. Once the solid virtual cell plane has been created for a cell, geometric shapes are pushed down from parent cells to the corresponding child cells, cells which represent various instantiations of the cell having its VHL generated. In some embodiments, the structure that receives the pushed down geometric shapes is an empty box called a cell plane. The geometric shapes that are hierarchically above all the placements of the cell and/or come from the current cell's sibling cells are pushed down into this empty cell plane. In some embodiments, a negative version of the empty plane or a solid virtual cell plane, i.e. a solid rectangle, is used as a receiving plane for the pushed data. The cell plane starts empty, or the solid virtual cell plane starts full, and receives geometric shapes from its parent and sibling cells to create holes in the receiving plane.

One embodiment of the current disclosure involves starting the VHL creation process with a solid virtual cell plane. As each shape falls into the plane, it cuts a hole in the plane. A plane with a cut hole can be visualized as an inverted VHL. After pushing all the polygons, the whole cell plane is negated (inverted) to obtain the actual VHL geometric shape. Using negative planes allows for a faster generation of a VHL for a situation with a large number of polygons overlapping the placements of a cell. As the polygons fall into the negative plane they cut holes which enable the algorithm to ignore any further shapes that fall into the cut holes. In this embodiment, the holes cut in the cell plane are used to ignore the overlapping shapes.

An additional embodiment provides for an optimization using an extended version of the solid plane concept. The modified method prepopulates a cell plane with the cell's local data and then uses the prepopulated cell as the negative plane. The negative plane retains only the geometric shapes that fall over the prepopulated shapes and ignores other shapes that fall into the holes. Effectively, the process ignores geometric shapes that do not touch the prepopulated shapes.

In another embodiment, a cell's local data is used to solve the complex mesh shape generated in a VHL edge layer. This embodiment is based on the idea that any VHL shapes further than an ambit value from a cell's local data do not impact the hierarchical processing. In other words, the VHL algorithm ignores polygons that are more than an ambit distance from the cell data. This embodiment uses a cell's local data as a reference to ignore shapes more than an ambit distance from the local data as the polygons are pushed down. Avoiding the crisscross mesh saves the CPU time spent in cycling all the shapes into the "don't care" areas of a cell. Pre-populating "don't care" areas with VHL polygons helps in avoiding resource allocation that would otherwise be spent in creating a mesh in those areas.

The disclosed embodiments reduce the VHL creation time and the complexity of its geometric shape. A simple and quicker VHL creation time improves the DRC commands' runtime and memory.

Further Details

FIG. 1 is a flow diagram for a negative plane VHL optimizer. The flow 100 describes a computer-implemented method for design analysis. The flow 100 includes obtaining a semiconductor design 110 including a plurality of cells and a plurality of design levels. The cells can be any of a variety of cells including logic cells, memory cells, switching cells, routing cells, and so on. The design levels can include hierarchical design levels, abstraction levels, etc. The hierarchical design levels can include cell levels, submodule levels, module levels, subsystem levels, system levels, and so on. The abstraction levels can include behavioral levels, register transfer levels (RTL), circuit levels, physical design levels, and so on. The semiconductor design can be obtained from a library of design layouts which are stored in computer-readable formats. The design can be obtained by reading one or more of the computer files from one or more storage media, by being read from computer memory, by using an RTL design to generate a circuit design, by receiving design data entered by a user, by receiving wired or wireless communications, by scanning layout images, and so on.

The flow 100 includes creating a creating a solid virtual cell plane 120 based on a semiconductor design including a plurality of cells and a plurality of design levels. The solid virtual cell plane can be a part of a virtual hierarchical layer (VHL). The VHL can be used for a variety of design purposes including but not limited to design simulation, design verification, and design validation, any of which can be done for a circuit, for a subsystem, or for a system, and can be a part of DRC, DRM, or the like. The VHL can represent a design layer, a logical layer, an abstract layer, a layout layer, or any other layer type appropriate to the semiconductor design. One embodiment of creating of the solid virtual cell plane includes negating an empty cell plane 122.

The flow 100 includes identifying a cell and multiple instances of the cell 130 from the plurality of cells. The identified cell can be a logical cell, a design cell, a physical cell, and so on. The cell can be a single cell, a repeated cell, etc. The cell can be part of a design hierarchy. The cell can appear throughout the design at various design levels. The identified instances of the cell can be rotated versions of the cell, mirrored versions of the cell, scaled versions of the cell, and so on. The cell and instances of the cell can be identified for any of a variety of purposes including logic simulation such as verification and validation; design simulation such as verification, validation, and design rules checking (DRC); design rules for manufacturing (DRM) verification; or any other purpose.

The system 100 includes determining, for the multiple instances, polygons which overlap the cell 140. The polygons can include rectangles, simple polygons, complex polygons, and other shapes appropriate to the semiconductor design, the technology node, and other aspects of the semiconductor design and fabrication process. The polygons can reside in any of the design levels of the semiconductor design. The polygons which overlap the cell and the instances of the cell can interact with the cell and the cell instances. The polygons which are determined can overlap the cell wholly or in part. In some cases, certain portions of a polygon, or shapes within the polygon, overlap the cell. Thus in embodiments, the polygons include shapes that interact with the cell. The shapes within the polygon that interact with the cell can be the entire polygon or a portion of the polygon, depending on the interaction between the polygon and the cell. The interactions between the polygons and the cell data can include design rules, manufacturing rules, etc. The polygons which overlap can connect to design data in the cell and cell instances, can overlap design data, can be adjacent to design data, or can be near design data.

The system 100 includes pushing a polygon from the polygons, which were determined, into the solid virtual cell plane to create a hole in the solid virtual cell plane 150. The polygons which are pushed can include rectangles, complex polygons, or any other appropriate shape. The pushing of polygons can continue for multiple cell instances. In embodiments, the solid virtual cell plane with the holes, which were created, can be cut by pushed polygons to result in a holed solid virtual cell plane. The holed solid virtual cell plane, which if inverted can be referred to as a virtual hierarchical layer (VHL), can be used for a variety of purposes including circuit, logic, and system analysis; system verification DRC; DRM; etc. In some embodiments, the polygons which are pushed do not include shapes which are outside the local data of the cell. The polygons which are pushed can represent overlapping data different from the data in the cell. The polygons can represent interactions for the cell instances, where the polygons are pulled from the design based on their interaction with an instance of the cell and then pushed into the solid virtual cell plane. In some embodiments, the polygons which are pushed are outside of the local data in the cell, such as polygons located outside of the cell but within an ambit value of the cell boundary. In some embodiments, the polygons which are pushed do not include shapes that are outside of the local data by an ambit value. An ambit value can be a small value and can be based on the design rules for a particular semiconductor process technology. The ambit value can be selected for a variety of purposes including convenience of modeling, simulation, analysis, and the like. In at least some embodiments, the holes which are created are only created in locations where there is no local data for the cell. Again, these holes can indicate additional interactions between cell instances and polygons in the layers of the semiconductor design.

In embodiments, the method continues with pushing a second polygon from the polygons into the solid virtual cell plane to create a second hole in the solid virtual cell plane, wherein the hole and the second hole comprise holes in the solid virtual cell plane. In some cases, the second hole includes an enlargement of the hole. This can be repeated any number of times with any number of polygons pushed into the solid virtual cell plane to create more holes and/or enlarged holes. Therefore the flow 100 can include pushing further polygons from the polygons onto the solid virtual cell plane 152 to create more holes in the solid virtual cell plane. The pushing further polygons can include pushing interactions between the instances of the cell and the design levels of the semiconductor design. The pushing further polygons can include merging holes on the solid virtual cell plane. The merging holes can represent the various polygons which overlap the cell and the instances of the cell. The merged holes can be represented by rectangles, simple polygons, complex polygons, or any other shape. As holes are created in the solid virtual cell plane, some of the further polygons can fall completely or partially into the existing holes.

In some embodiments, the flow 100 includes replacing the solid virtual cell plane with a plane populated with local data 154. The pre-populating can simplify the creation of holes in the solid virtual cell plane by allowing more of the further interactions to fall into the holes created by the prepopulated data. The flow 100 can further include oversizing the local data from the cell 156 and prepopulating the solid virtual cell plane 158 with the oversized local data. In at least one embodiment, the oversizing is by an ambit value. As mentioned above, the oversizing can serve a variety of purposes including convenience of modeling, simulation, analysis, verification, or any other purpose. The oversizing of the local data can be by any appropriate value. In embodiments, the prepopulating creates "don't care" areas within the solid virtual cell plane. The "don't care" areas can be used to simplify a variety of modeling, simulation, verification, and validation tasks, for example, by reducing complexity and computational resource requirements.

The flow 100 includes ignoring further shapes that fall within the holes 160. The further shapes can come from polygons interacting with instances of the current cell. The pushing of further interactions between polygons from the semiconductor design and the cell instances into the virtual cell plane can result in increasing numbers of holes in the plane. A new polygon interaction can fall within an existing hole in the plane without creating a new hole; or the new polygon can partially overlap an existing hole, so that a portion of the polygon, or a shape representing the portion of the polygon, falls within an existing hole. Thus in some cases, the further shapes include an entire polygon from the polygons, and in other cases, the further shapes include a portion of an additional polygon from the polygons. In both cases, the further shapes are ignored because they fall within the existing holes 162. Ignoring the shapes falling within holes can reduce the amount of data stored in the virtual cell plane for analysis, simulation, modeling, verification, and other purposes. The ignoring can be based on a variety of parameters including percentage of solid cell plane area consumed by holes, number of cell instances included in the pushing of polygons into the solid plane, or any other appropriate parameter. The ignoring can reduce modeling complexity, computational resources required, and the like. The ignoring can include ignoring shapes from parent and sibling cells 164 to the cell.

The flow 100 further includes inverting the holed solid virtual cell plane 170. The inverting can, for example, simplify the representation of the virtual cell plane by converting many complex holes in the plane into a few data shapes in the inverted plane. The inverting can be used to create a VHL for the cell. The inverting can serve various purposes including, but not limited to, modeling, simulation, and verification of the cell and the semiconductor design. The inverting can reduce the time required for performing tasks such as modeling, simulation, verification, and the like. The inverting can reduce the amount of computational resources required to perform the modeling, simulation, verification, and other tasks. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
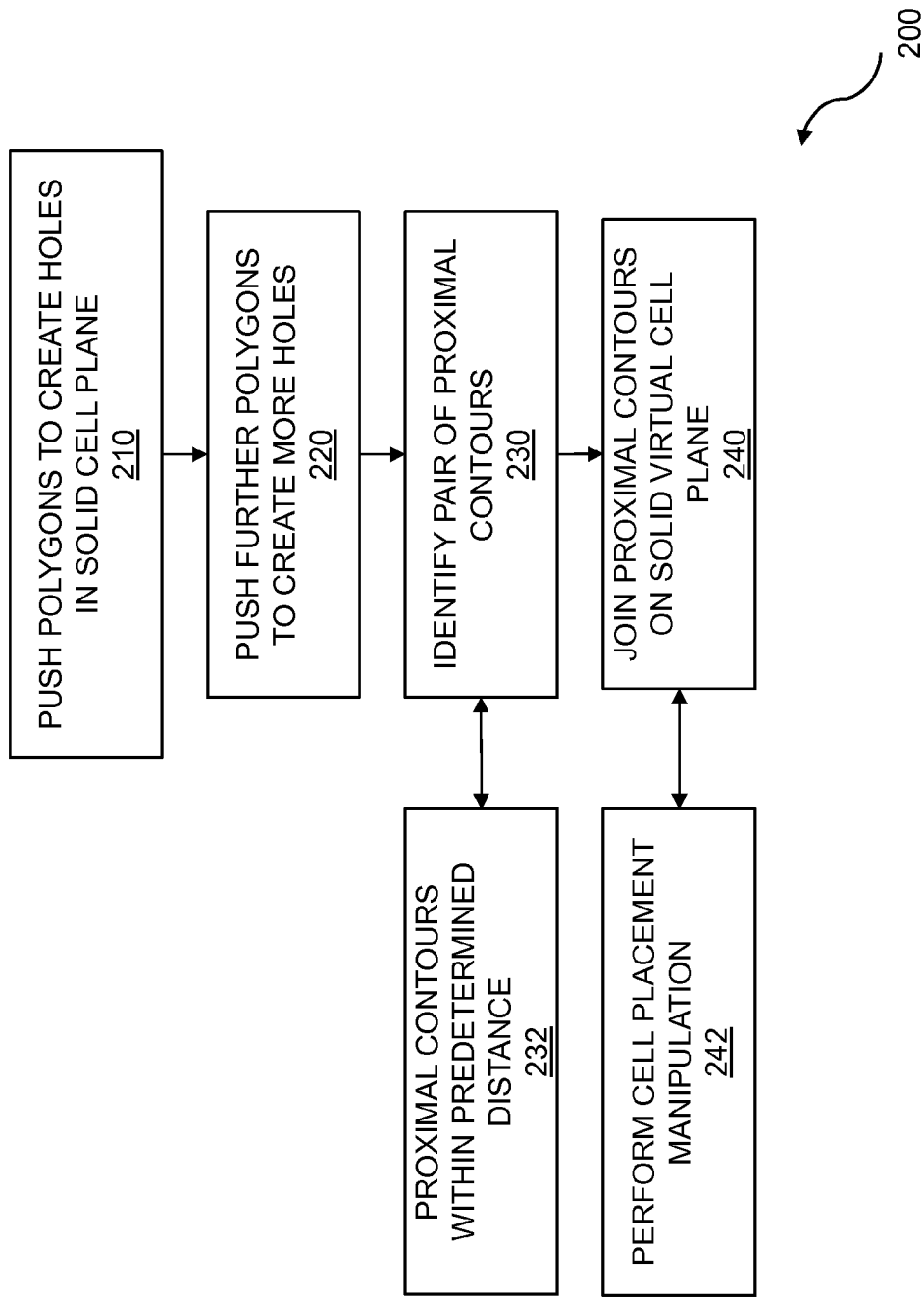
FIG. 2 is a flow for joining proximal contours.

FIG. 2 is a flow for joining proximal contours. The flow 200 describes a computer-implemented method for design analysis and can be used in conjunction with embodiments of the flow 100. The flow 200 includes pushing polygons to create holes in a solid cell plane 210. The polygons which are pushed can include rectangles, complex polygons, or any other appropriate shape. In embodiments, the solid virtual cell plane with the created holes comprises a holed solid virtual cell plane. The holed solid virtual cell plane, which if inverted can be referred to as a virtual hierarchical layer (VHL), can be used for a variety of purposes including circuit, logic, and system analysis, system verification DRC, DRM, etc. In embodiments, the polygons which are pushed do not include shapes which are away from local data of the cell. The polygons which are pushed can represent overlapping data different from the data in the cell. The polygons can represent interactions for the cell instances, where the polygons are pulled from the design based on their interaction with an instance of the cell and then pushed into the solid virtual cell plane. In some embodiments, the polygons which are pushed do not comprise the local data in the cell, such as polygons located outside of the cell but within an ambit value of the cell boundary. In some embodiments, the polygons which are pushed do not include shapes that are outside of the local data by an ambit value. An ambit value can be a small value and can be based on the design rules for a particular semiconductor process technology. The ambit value can be selected for a variety of purposes including convenience of modeling, simulation, analysis, and the like. In at least some embodiments, the holes which are created are only created in locations where there is no local data for the cell. Again, these holes can indicate additional interactions between cell instances and polygons in the layers of the semiconductor design.

In embodiments, the method continues with pushing further polygons from the polygons into the solid virtual cell plane to create more holes in the solid virtual cell plane 220. In some cases, pushing further polygons into the solid virtual cell plane enlarges an existing hole instead of creating a new hole. The pushing further polygons from the polygons into the solid virtual cell plane can create any number of holes of any shape in the solid virtual cell plane, depending on the details of the semiconductor design.

The flow 200 includes identifying a pair of proximal contours 230. A contour, as the term is used herein and in the claims, is a portion of the solid virtual cell plane that remains after holes are created. In embodiments, a pair of contours is identified as being proximal 230 if each contour of the pair of contours is within a predetermined distance of each other 232. The predetermined distance can be defined based on various parameters of the semiconductor fabrication process; the design rules; convenience for simulation, verification, and the like; or any other way of defining the predetermined distance for a particular embodiment.

The flow 200 also includes joining the pair of proximal contours 240. The joining can be accomplished by simply expanding the pair of proximal contours toward each other until they join. In some embodiments, the pair of proximal contours are joined by finding tangential lines to the pair of proximal contours and defining a new hole encompassing the pair of proximal contours, then using sections of the two tangential lines between the pair of proximal contours as two sides of the new larger hole. Any method can be used to join the pair of proximal contours, depending on the embodiment.

In some embodiments, the flow 200 includes performing a cell placement manipulation 242. The placement of a cell, in some cases, can be moved slightly without affecting the functionality of the semiconductor design. By moving the cell, the two proximal contours can be joined into one contour by some embodiments. By joining the proximal contours, the hole pattern of the holed solid virtual cell plane can be simplified, which can reduce the storage requirements, processing requirements, and complexity of the VHL.

Figure 3:
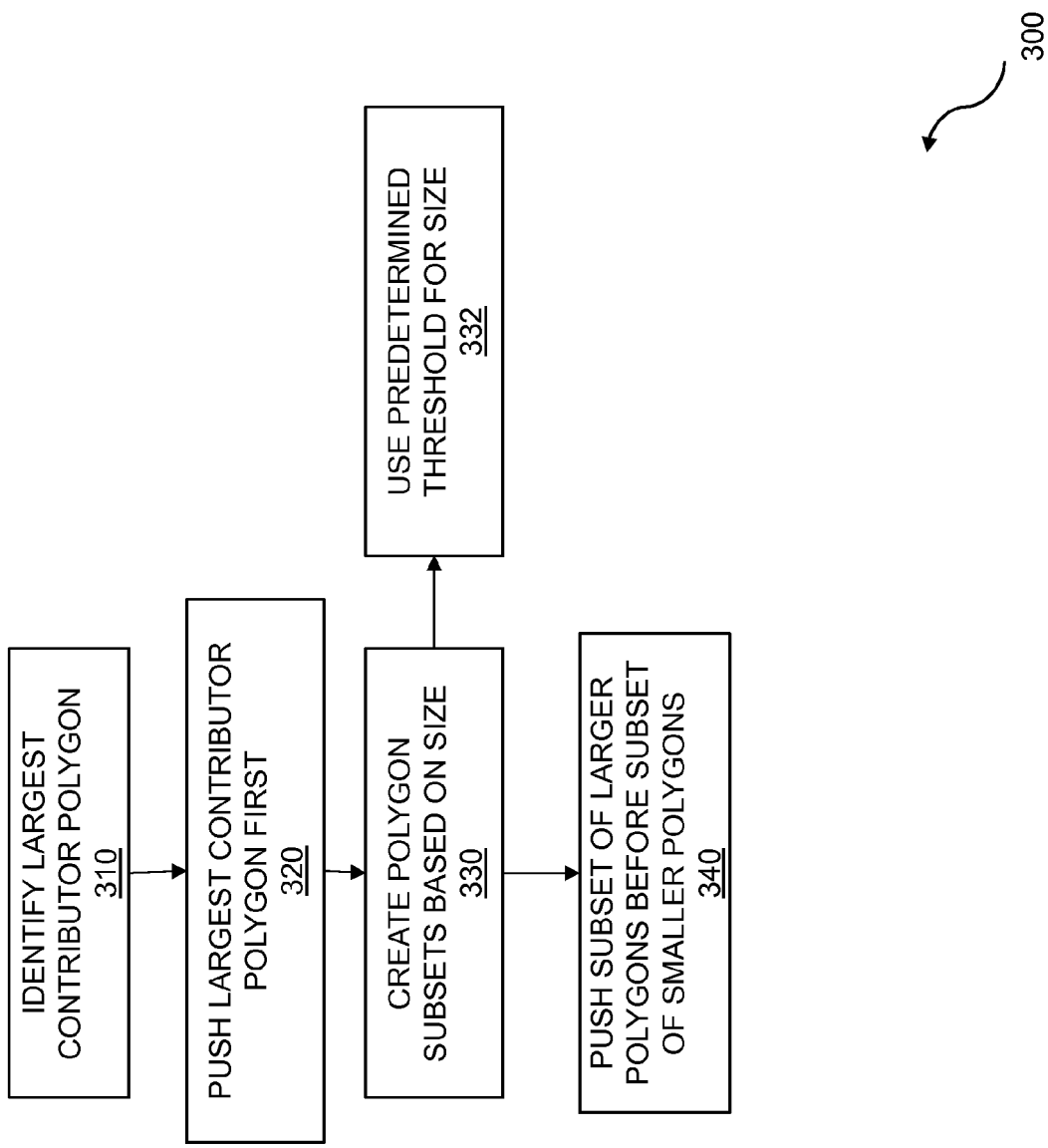
FIG. 3 is a flow for polygon size analysis.

FIG. 3 is a flow for polygon size analysis. The flow 300 can start with optionally identifying a largest contributor polygon from the polygons which were determined 310. In some embodiments, the polygons which were determined to overlap the cell are sorted from largest to smallest, but in other embodiments, no sorting is performed. If no sorting is performed, the polygons which are determined to overlap the cell can be searched to identify the largest contributor polygon. If multiple polygons have the same size and are tied as the largest contributor, one of the polygons can be identified as the largest contributor polygon. The identifying can be done by any method, including, but not limited to, the simplest polygon shape, the first polygon of that size to be found, the last polygon of that size to be found, or randomly. The flow 300 continues with pushing the largest contributor polygon first 320. The prioritized pushing creates the largest hole in the solid virtual cell plane of any of the polygons determined to overlap the cell. By creating the largest hole first, more of the later polygons pushed into the solid virtual cell plane fall completely into the hole created by the largest contributor polygon, allowing them to be ignored. Further, more of the polygons later pushed into the solid virtual cell plane fall partially into the hole, allowing shapes within those polygons to be ignored, and allowing the hole to be expanded rather than creating a new hole. If the further polygons pushed into the solid virtual cell plane fall completely or partially into the existing hole, storage and computational requirements can be reduced.

In some embodiments, the flow 300 optionally includes creating polygon subsets based on size 330. Larger polygons are put in one subset, while smaller polygons are put in another subset. Some embodiments use more than two subsets of polygons where each subset includes polygons having a particular range of sizes. In some embodiments, a predetermined size threshold is used 332 to determine which subset a polygon is put into. Thus, at least some embodiments include identifying a first subset of polygons from the polygons which were pushed, wherein each polygon of the first subset of polygons has an area that exceeds a predetermined threshold; and identifying a second subset of polygons from the polygons which were pushed, wherein each polygon of the second subset of polygons has an area that is less than or equal to a predetermined threshold. In the flow 300 the first subset of larger polygons is pushed prior to pushing the second subset of smaller polygons 340. The prioritized pushing of sets has a similar effect to pushing the largest contributor polygon first in that by creating large holes in the solid virtual cell plane as quickly as possible, more of the further polygons pushed will fall into the existing hole(s), reducing the storage and computational requirements. In at least one embodiment, the polygons are fully sorted so that each polygon size has its own subset and the polygon subsets are pushed in the order of size, with the largest first. Note that steps 310 and 320 are included in some embodiments while steps 330, 332, and 340 are omitted. Other embodiments include steps 330, 332, and 340 without including steps 310 and 320. Yet other embodiments include the entire flow 300, depending on the embodiment.

Figure 4:
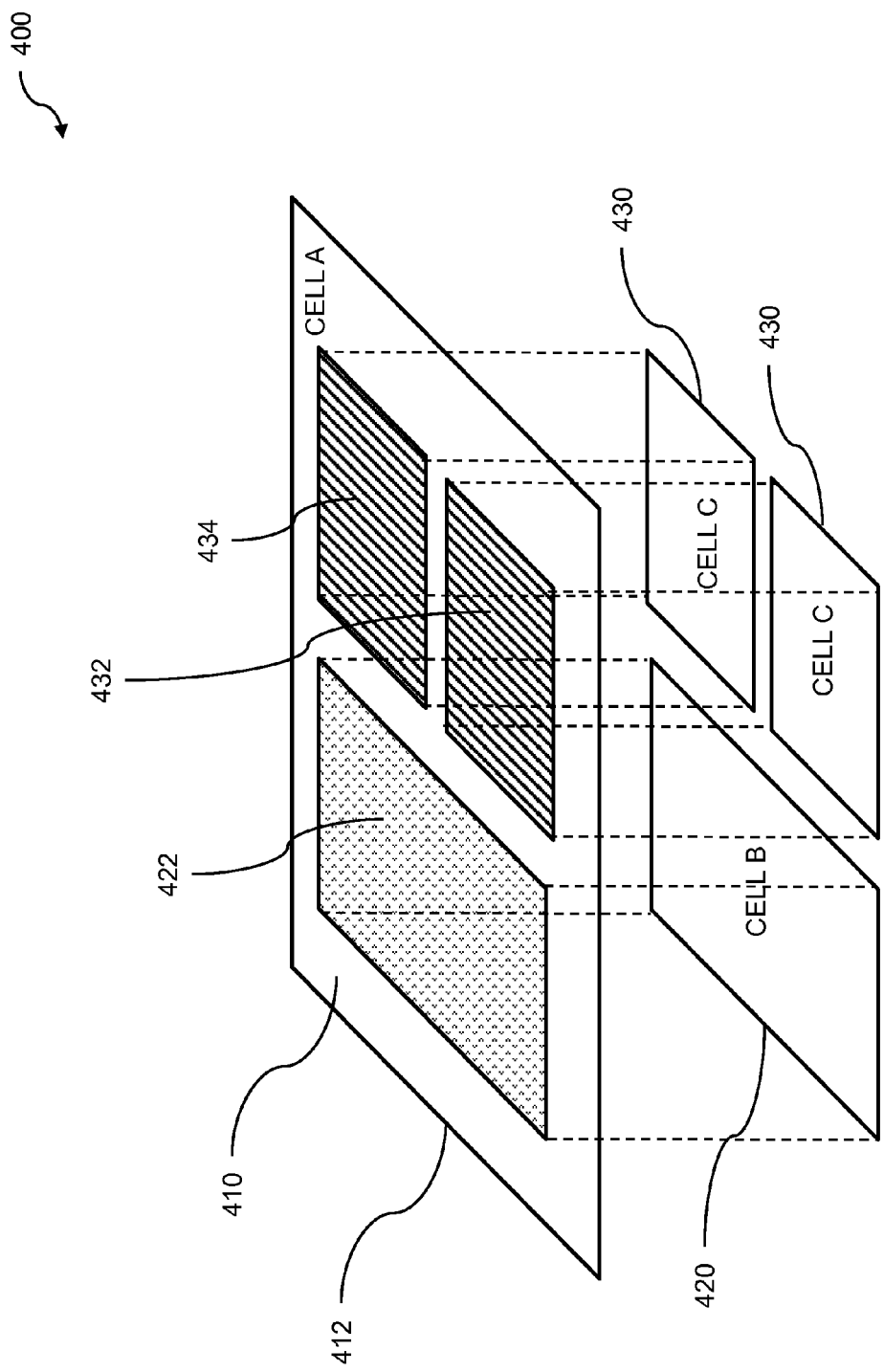
FIG. 4 shows an example of a simple hierarchy with a parent cell A, one placement of cell B, and two placements of cell C.

FIG. 4 shows an example of a simple hierarchy with a parent cell A, one placement of a child cell B, and two placements of child cells C. A portion of an electronic design 400, which can be a semiconductor design, has a parent cell 410 that has a cell border 412. The parent cell 410 also includes an instantiation 422 of cell B 420, and two instantiations 432 and 434 of cell C 430. Both instantiations 432 and 434 of cell C 430 refer to the same cell, which is a common practice in hierarchical design practice. Any number of child cells may be placed into a parent cell, depending on the requirements of the electronic design.

Figure 5:
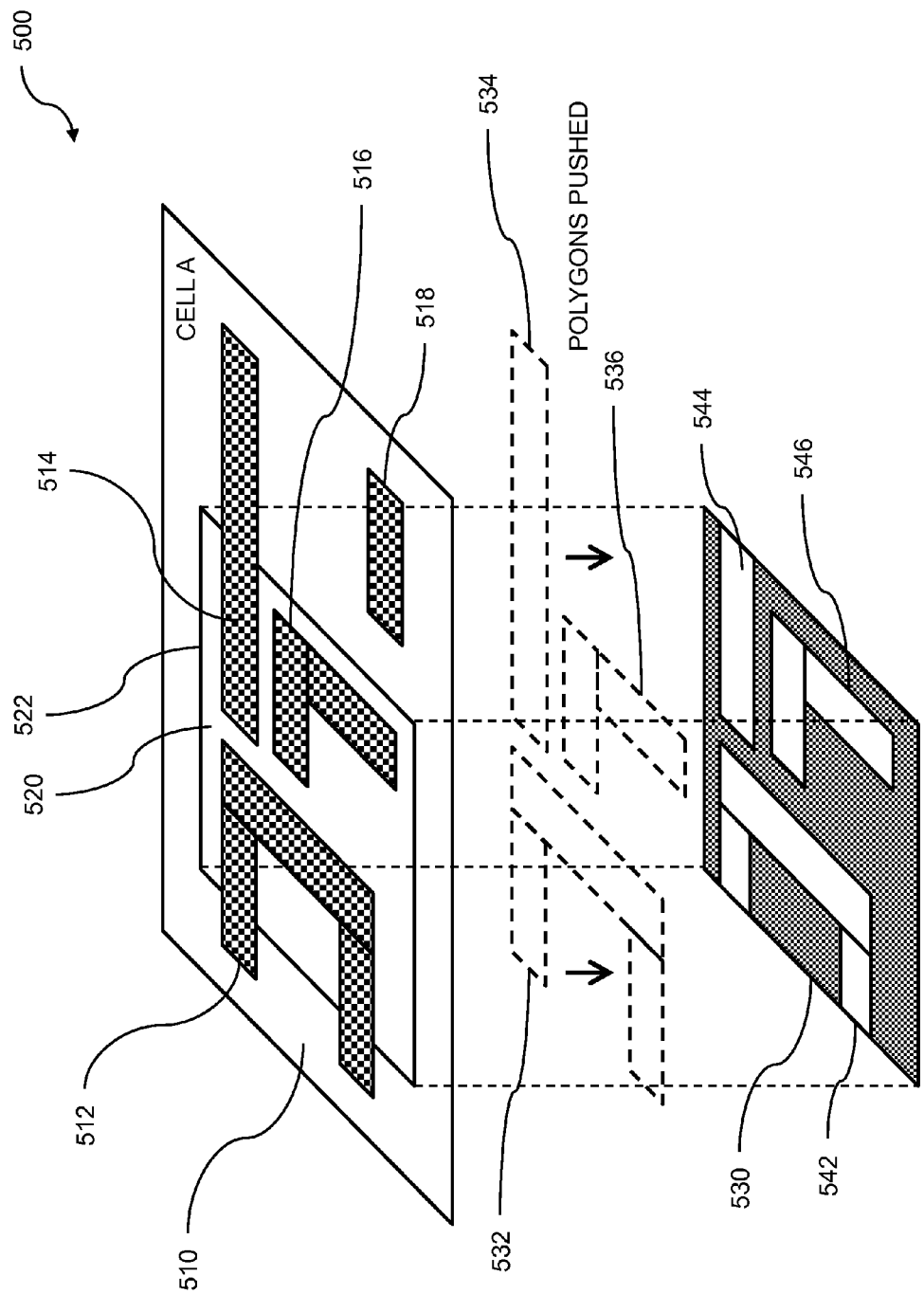
FIG. 5 shows an example holed solid virtual cell plane created by pushing down polygons from cell A to cell B.

FIG. 5 shows an example holed solid virtual cell plane created by pushing down polygons from cell A to cell B. An electronic design 500, which can be a semiconductor design, includes an instantiation 510 of cell A. The instantiation 510 of cell A includes several polygon shapes, including a first polygon 512, a second polygon 514, a third polygon 516 and a fourth polygon 518. The instantiation 510 of cell A also acts as a parent cell to an instantiation 520 of cell B that has a cell boundary 522. As a part of creating a VHL for cell B, some embodiments create a solid virtual cell plane 530 having a boundary that is equivalent to the boundary 522 of cell B. Polygons which overlap instantiations of cell B are then determined. For the instantiation 520 of cell B, the polygons 512-518 of the instantiation 510 of cell A are evaluated to determine if they overlap the instantiation 520 of cell B. The first polygon 512 partially overlaps the instantiation 520 of cell B, so the overlapping portion is pushed 532 into the solid virtual cell plane 530 to create a hole 542. The second polygon 514 partially overlaps the instantiation 520 of cell B, so the overlapping portion is pushed 534 into the solid virtual cell plane 530 to create another hole 544. The third polygon 516 completely overlaps the instantiation 520 of cell B, so the entire polygon is pushed 536 into the solid virtual cell plane 530 to create a third hole 546. The fourth polygon 518 does not overlap the instantiation 520 of cell B, so it is not pushed into the solid virtual cell plane 530. This process can be repeated for other instantiations of cell B in the electronic design.

Figure 6:
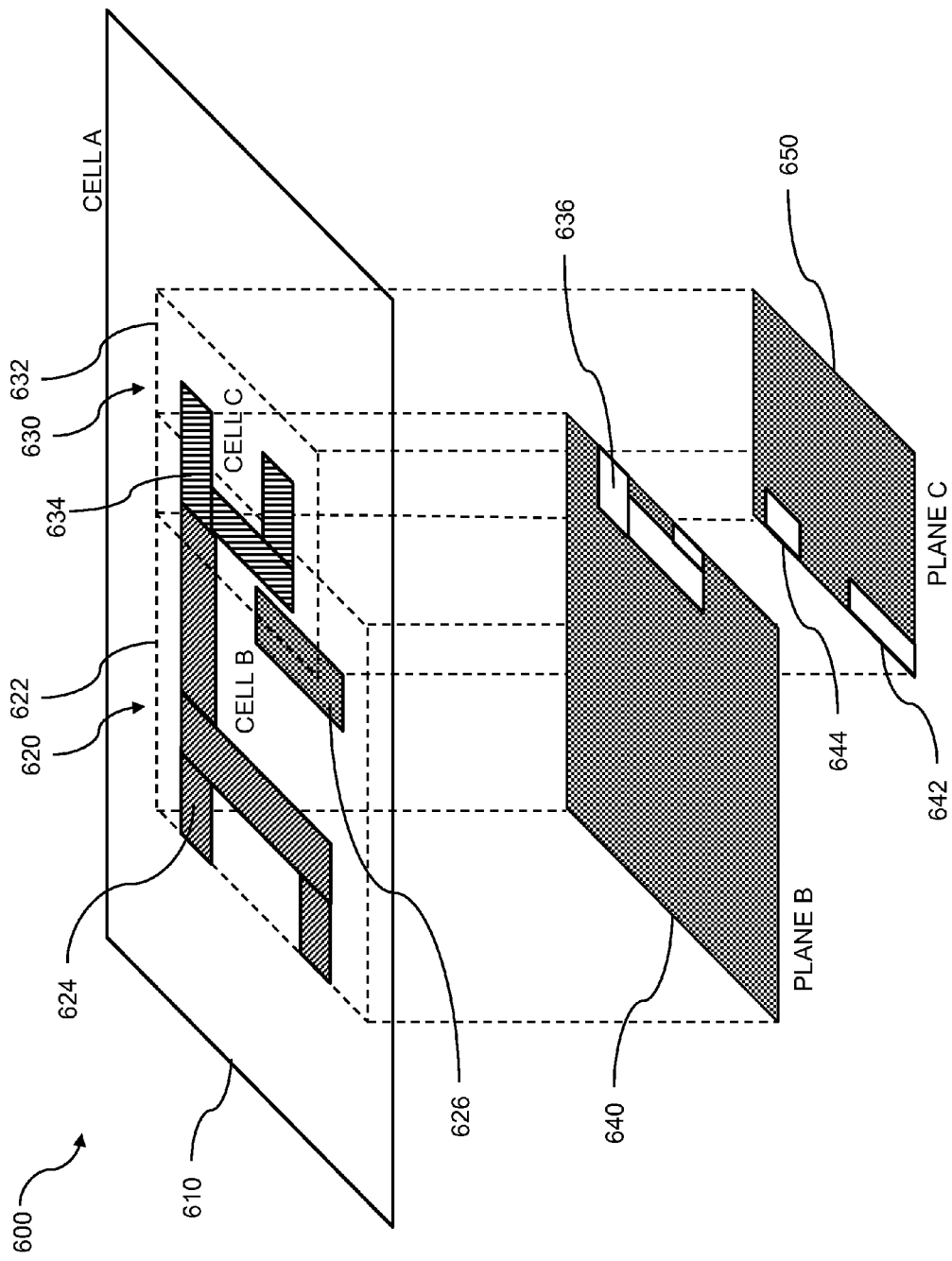
FIG. 6 shows an example holed solid virtual cell plane created by sibling cells' (cell B and cell C) interaction.

FIG. 6 shows an example holed solid virtual call plane created by sibling cell (cell B and cell C) interaction. An electronic design 600 can be a semiconductor design that includes an instantiation 610 of cell A. The instantiation 610 of cell A acts as a parent cell to an instantiation 620 of cell B that has a cell boundary 622 and an instantiation 630 of cell C that has a cell boundary 632. Cell B includes a complex polygon 624 and a rectangle 626. Cell B includes a complex polygon 634.

FIG. 6 shows polygons getting pushed from sibling cell B to cell C and vice versa. A solid virtual cell plane B 640 is created that has a boundary equivalent to boundary 622 of cell B. Polygons that overlap an instantiation of cell B are determined, such as the complex polygon 634 of the sibling instantiation 630 of cell C which partially overlaps the instantiation 620 of cell B. The overlapping portion of complex polygon 634 is then pushed into the solid virtual cell plane B 640 to create a hole 636. Polygons that overlap an instantiation of cell C are determined, such as the complex polygon 624 and the rectangle 626 of the sibling instantiation 620 of cell B. The overlapping portion of the complex polygon 624 and the overlapping portion of the rectangle 626 are then pushed into the solid virtual cell plane C 650 to create a hole 644 and another hole 643 respectively. The holed solid virtual cell plane 640, including the hole 636 can be used in creating the VHL of cell B, and the hold solid virtual cell plane 650 including the holes 642 and 644 can be used in creating the VHL for cell C.

Figure 7:
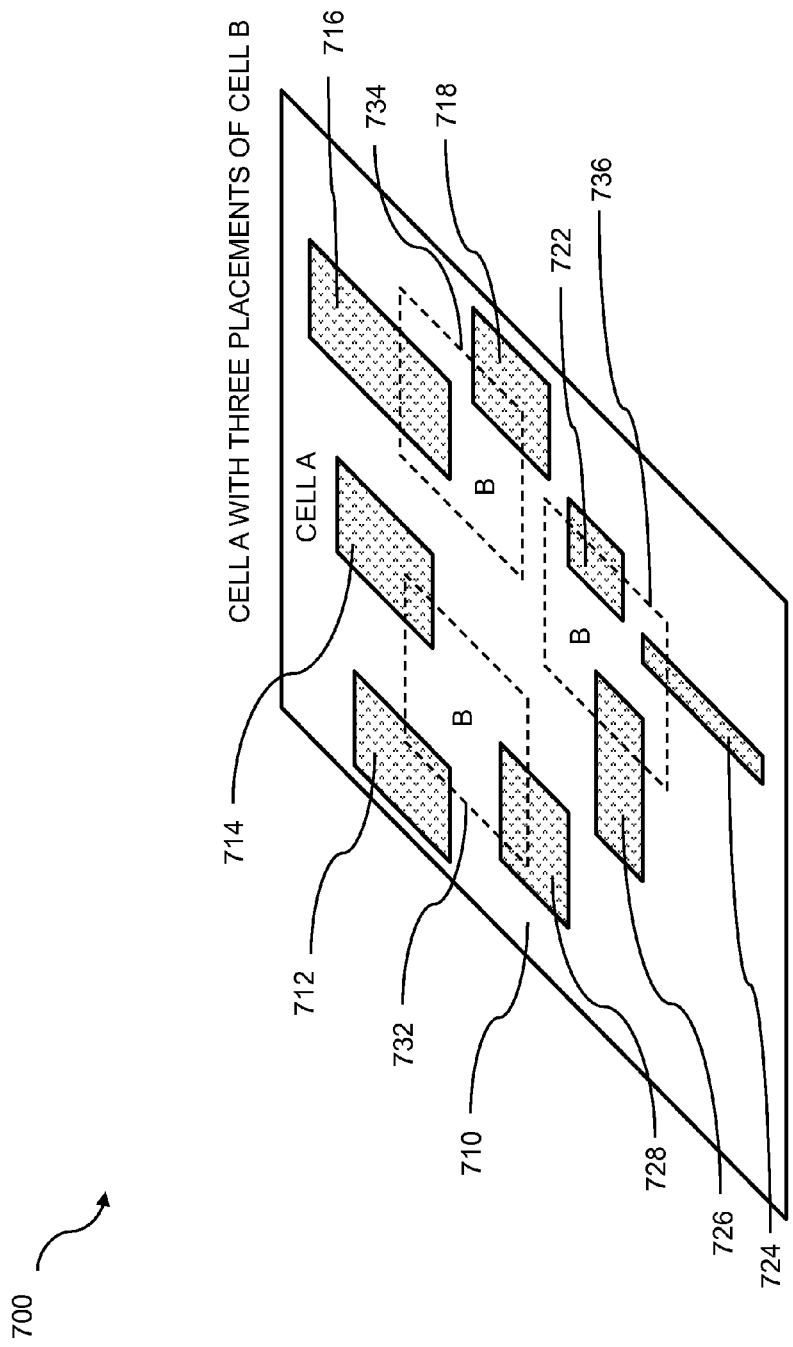
FIG. 7 shows an example of non-overlapping polygons of child cells B in parent cell A.

FIG. 7 shows an example of non-overlapping polygons of child cells B in parent cell A. A portion of an electronic design 700, which can be a semiconductor design, includes an instantiation 710 of cell A which includes several polygons, a first polygon 712, a second polygon 714, a third polygon 716, a fourth polygon 718, a fifth polygon 722, a sixth polygon 724, a seventh polygon 726, and an eighth polygon 728. Cell A also has three instantiations of cell B, a first instantiation 732, a second instantiation 734 and a third instantiation 736. Cell A can be placed in a design where pushed polygons can evidence few overlaps with polygons from other cells, although in some designs, cell A can have many other overlapping polygons from parent or sibling cells.

Figure 8:
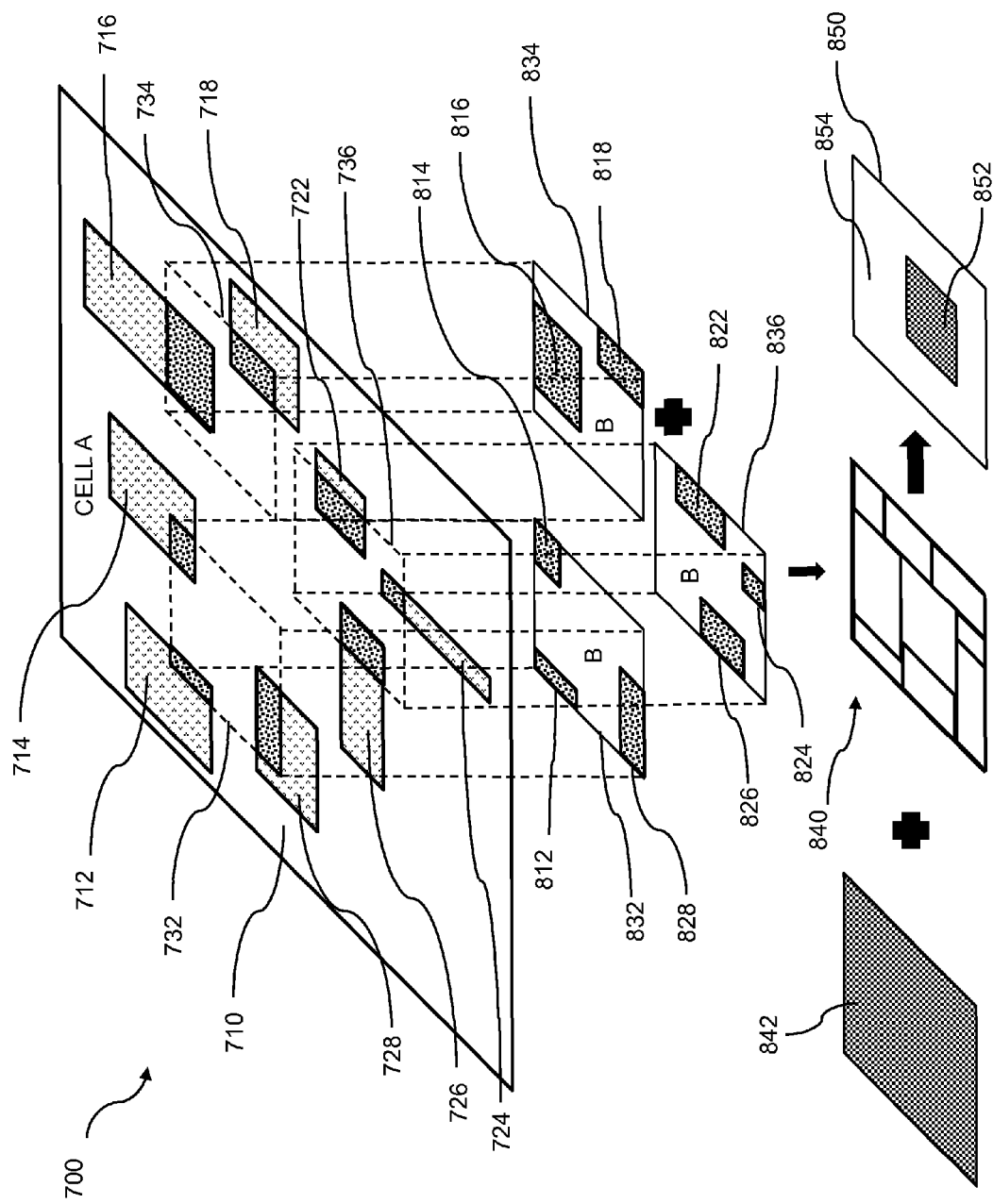
FIG. 8 shows an example of non-overlapping polygons pushed into cell B's cell plane.

FIG. 8 shows an example of overlapping polygons pushed into cell B's cell plane. FIG. 8 shows the same portion of an electronic design 700 as shown in FIG. 7, including the pushed polygons to create a VHL for cell B. Cell B is identified for creating a VHL and multiple instances of cell B, including the first instantiation 732, the second instantiation 734, and the third instantiation 736, are identified. Polygons which overlap cell B are determined for the multiple instances 732, 734, and 736. A first boundary 832 shows the polygons which are pushed from the parent cell instance 710 into the first instance 732 of cell B. The first boundary 832 includes an overlapping portion 812 of the first polygon 712, an overlapping portion 814 of the second polygon 714, and an overlapping portion 828 of the eighth polygon 728. A second boundary 834 shows the polygons which are pushed from the parent cell instance 710 into the second instance 734 of cell B. The second boundary 834 includes an overlapping portion 816 of the third polygon 716 and an overlapping portion 818 of the fourth polygon 718. A third boundary 836 shows the polygons which are pushed from the parent cell instance 710 into the third instance 736 of cell B. The third boundary 836 includes an overlapping portion 822 of the fifth polygon 722, an overlapping portion 824 of the sixth polygon 724, and an overlapping portion 826 of the seventh polygon 726. An overlapping portion of a polygon can also be referred to as a shape.

The eight overlapping shapes 812-828 are combined into a single set of consolidated geometric shapes 840. A solid virtual cell plane 840 is created that corresponds to the boundary of cell B, and the consolidated shapes 840 are then pushed into the solid virtual cell plane 842 to create holes.

The pushing creates a holed solid virtual cell plane 850 that includes a hole 854 covering the outer edges of the holed solid virtual cell plane 850, with a solid portion 852, or contour, remaining in the center.

Figure 9:
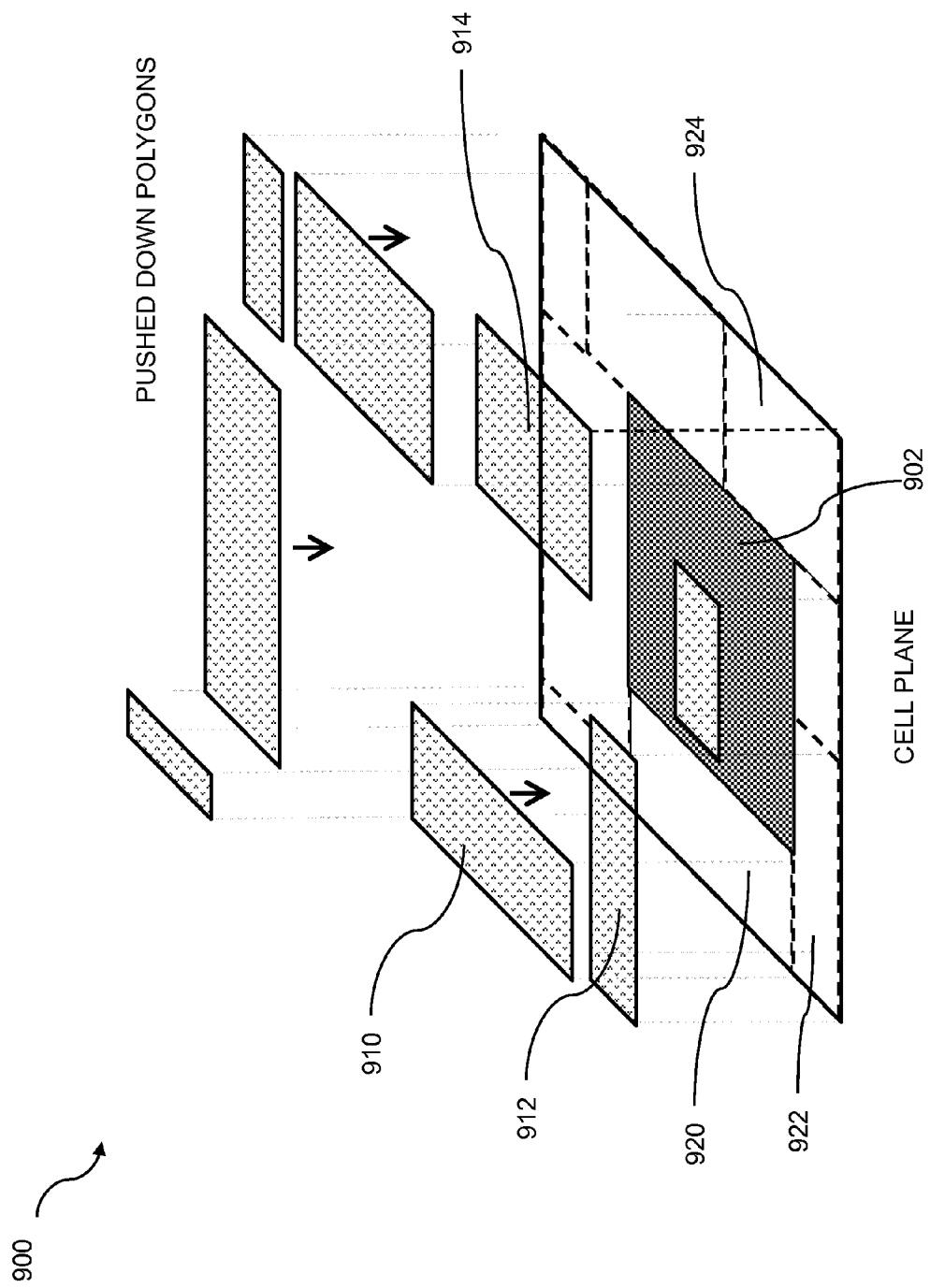
FIG. 9 shows an example cell plane receiving non-overlapping polygons pushed down from the top.

FIG. 9 shows an example cell plane receiving non-overlapping polygons pushed down from the top. The diagram 900 shows geometric shapes pushed down from higher levels in a design hierarchy to form consolidated holes in a solid virtual cell plane 902. The diagram 900 shows polygons being pushed down that are similar to those polygons shown in FIG. 8. Eight different polygons, which are shown lightly hatched and which include a first polygon 910, a second polygon 912, and a third polygon 914, are pushed into the solid virtual cell plane 902. The eight polygons are non-overlapping but abut one another so that the consolidated polygons form a square annular ring hole around the outside of the solid virtual cell plane 902 surrounding a contour in the middle of the solid virtual cell plane 902. The square annular ring hole includes a first portion 920 that was formed by the first polygon 910, a second portion 922 that was formed by the second polygon 912, and a third portion 924 that was formed by the third polygon 914, as well as five other portions formed by the other five polygons. Thus, the diagram 900 shows an isometric view of a cell plane receiving polygons where the polygons are merged into a geometric shape. Many polygons in an electronic design are non-overlapping, so the diagram 900 illustrates how non-overlapping shapes can be merged.

Figure 10:
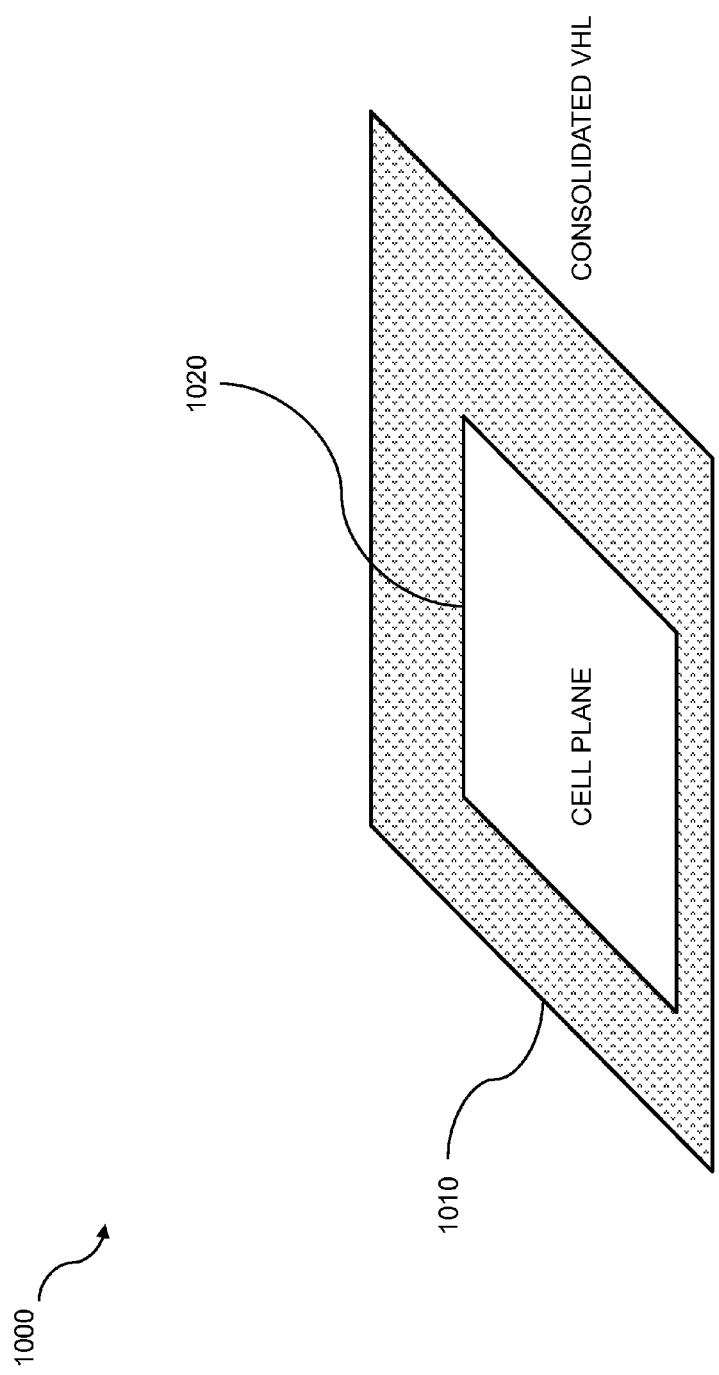
FIG. 10 shows an example of a consolidated VHL in a cell plane.

FIG. 10 shows an example of a consolidated VHL in a cell plane. The consolidated VHL data 1000, shown graphically, is based on the holed solid virtual cell plane 900 of FIG. 9. The consolidated VHL 1000 represents an inverted version of the holed solid virtual cell plane shown in diagram 900. The consolidated VHL 1000 includes a boundary 1010 that corresponds to the identified cell upon which the consolidated VHL 1000 is based. In the example shown, the consolidated VHL 1000 has a hole 1020 in the middle. VHL data can have any number of solid and holed areas within the boundary, depending on the semiconductor design.

Figure 11:
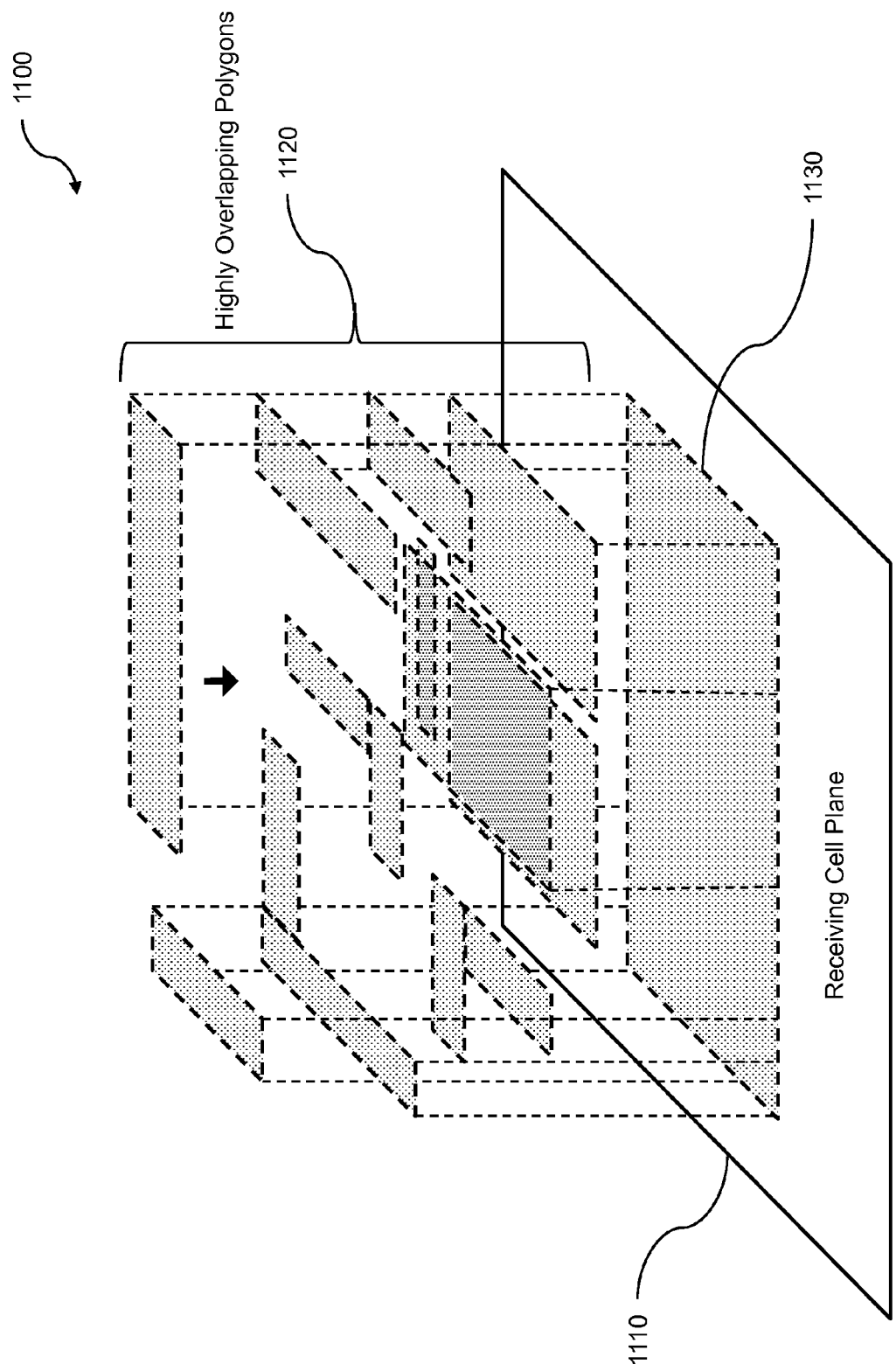
FIG. 11 shows an example cell plane receiving overlapping polygons from the top.

FIG. 11 shows an example cell plane receiving overlapping polygons from the top. In a typical semiconductor design, a cell plane can receive a very large number of overlapping polygons, as shown by the diagram 1100. The VHL creation algorithm can expend substantial CPU resources pushing multiple polygons that overlap existing holes in the plane. Each time this occurs, the algorithm also spends time consolidating each additional shapes to create the final merged shape, even if the final shape is totally within an existing hole. The number of polygons that get pushed into a cell plane can range from a few hundred to billions based on various factors such as the depth at which the cell is placed in the hierarchy, the number of placements of the cell, the number of parents and siblings, and the number of overlapping polygons in parents and siblings. An isometric view of a cell plane 1110 depicts receiving multiple overlapping shapes 1120 from levels above it in the hierarchy. In the example shown in the diagram 1100, the overlapping shapes 1120 combine to form a simple rectangle 1130, but many computational resources are required if each polygon is fully analyzed.

Figure 12:
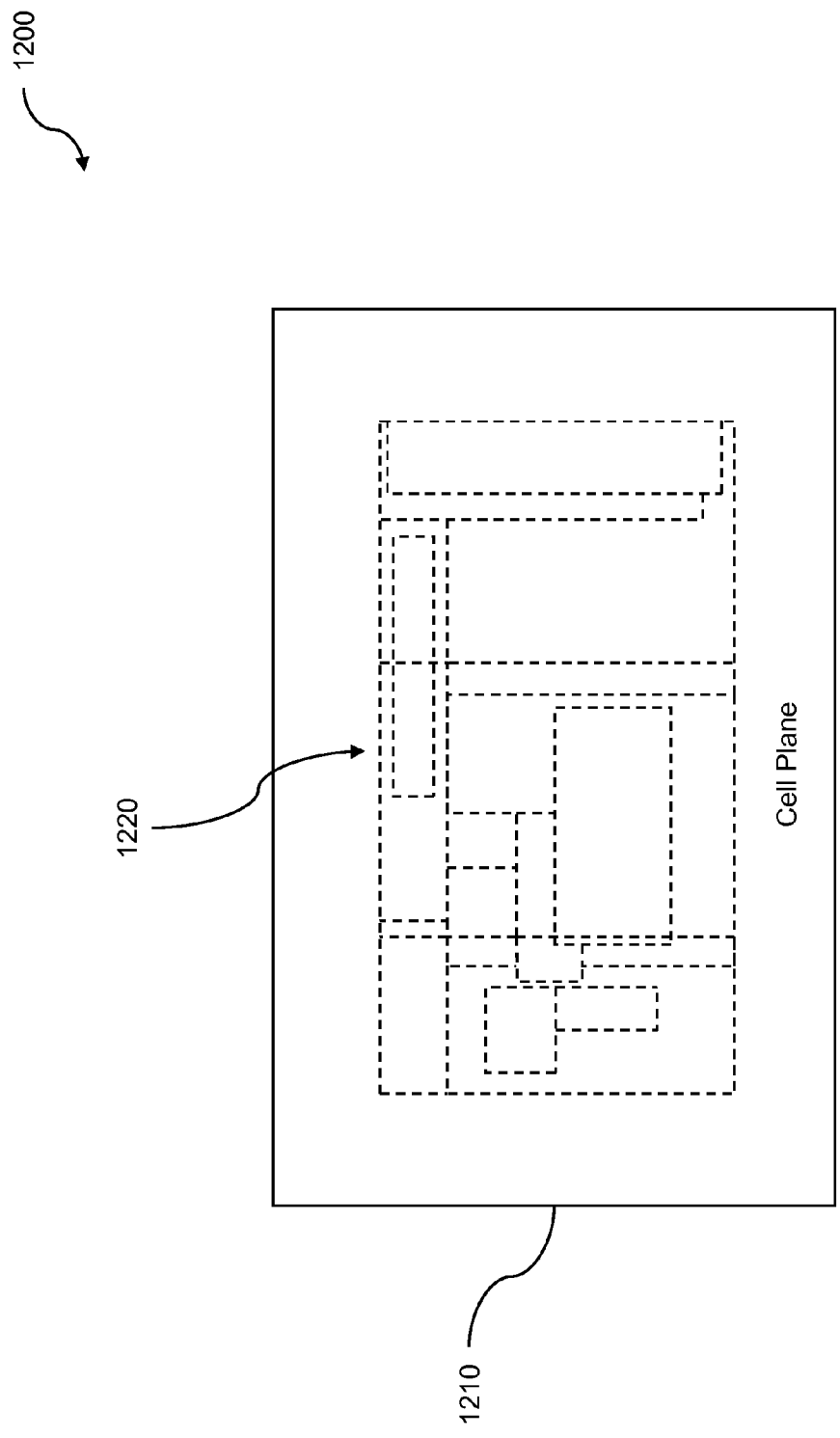
FIG. 12 shows an example of a cell plane with consolidated overlapping polygons.

FIG. 12 shows an example of a cell plane with consolidated overlapping polygons. In some embodiments, edges are processed instead of shapes as shown in the diagram 1200. If a large number of overlapping polygons are pushed into the cell plane 1210, a complex mesh of edges 1220 can result. The edges cannot be consolidated as easily as the polygons can be to form a single simple shape as shown in the diagram 1100.

Figure 13:
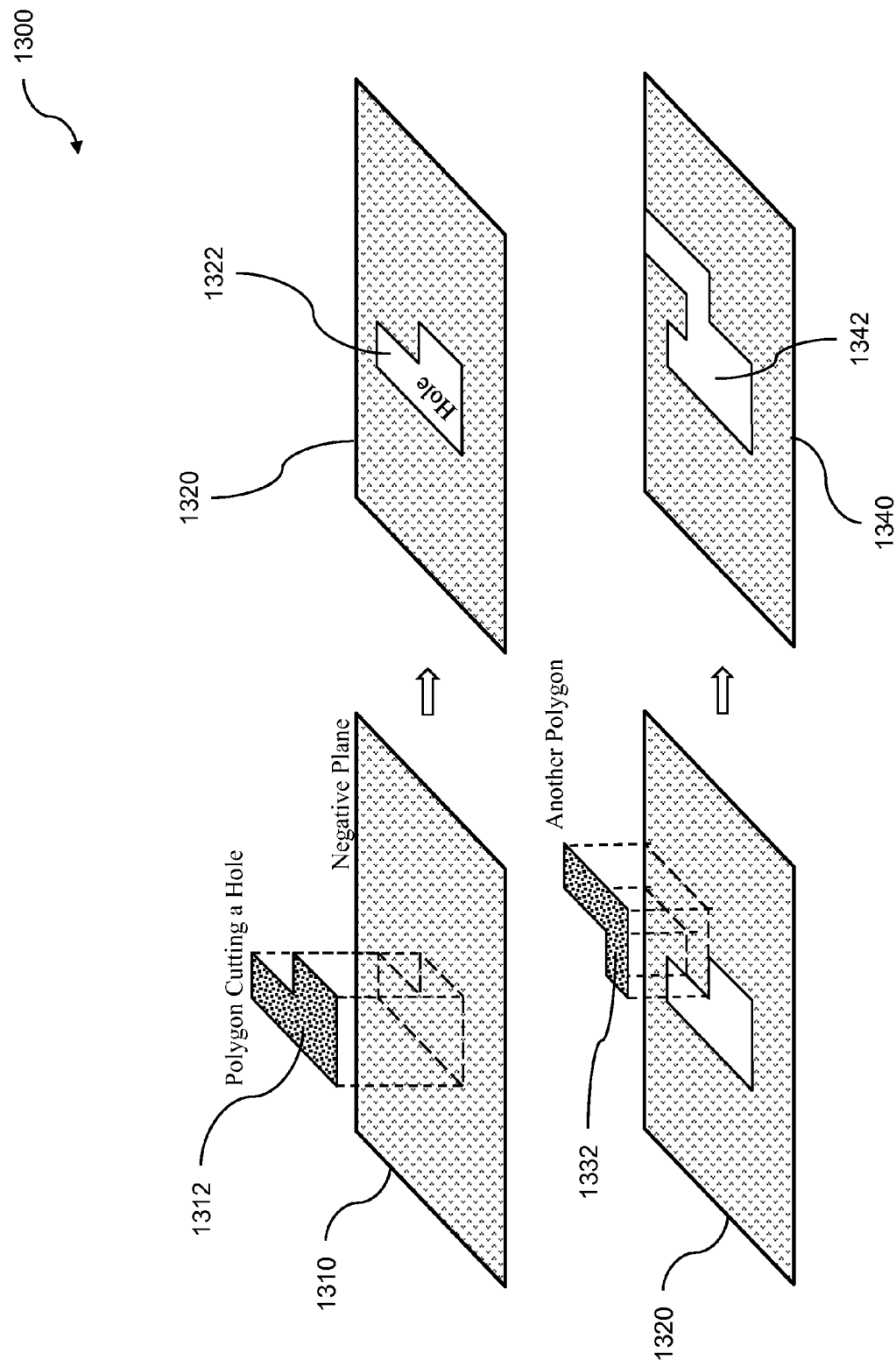
FIG. 13 shows example steps involved in creating a VHL using a negative plane.
Figure 14:
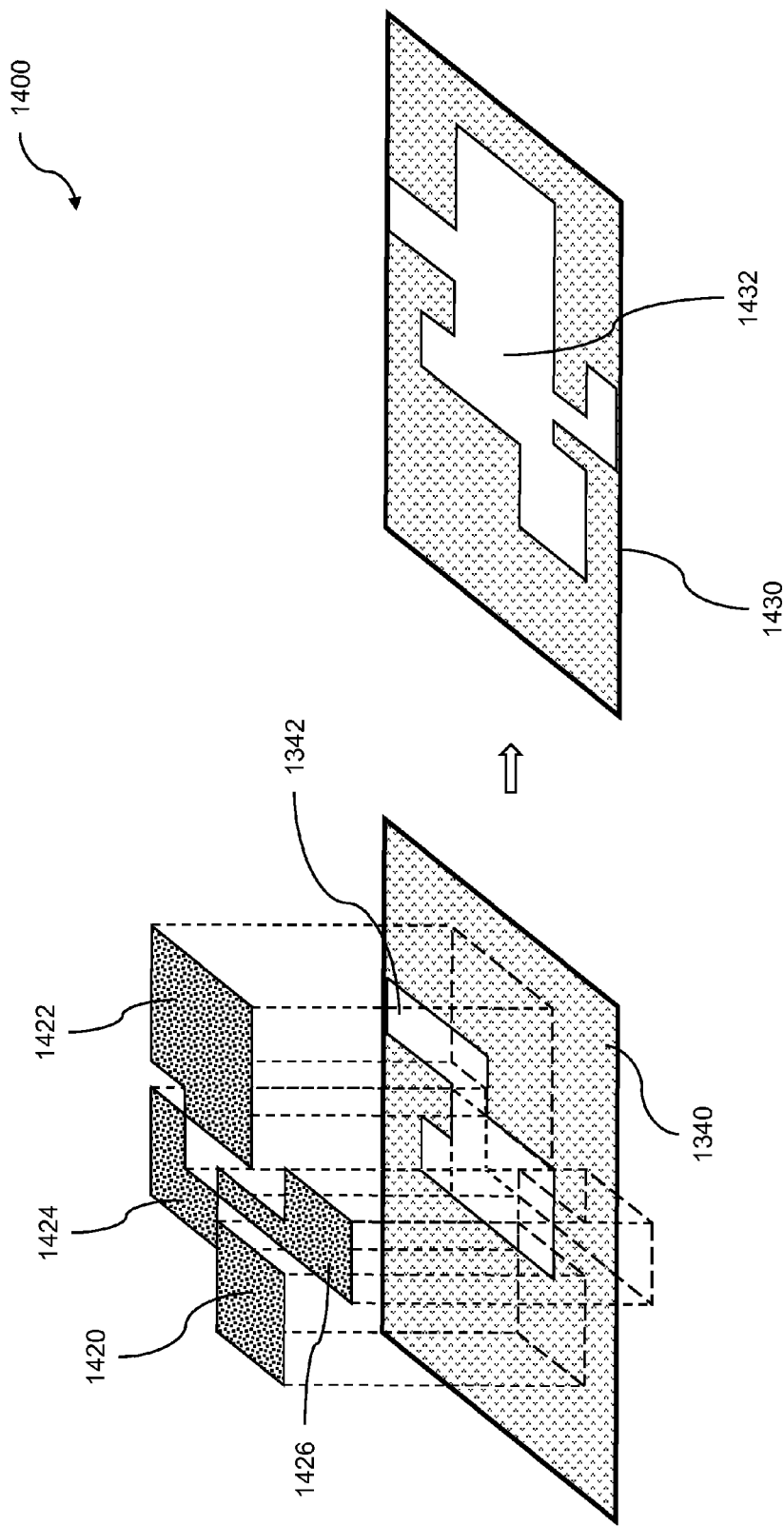
FIG. 14 shows an example of pushing additional polygons in creating a VHL using a negative plane.
Figure 15:
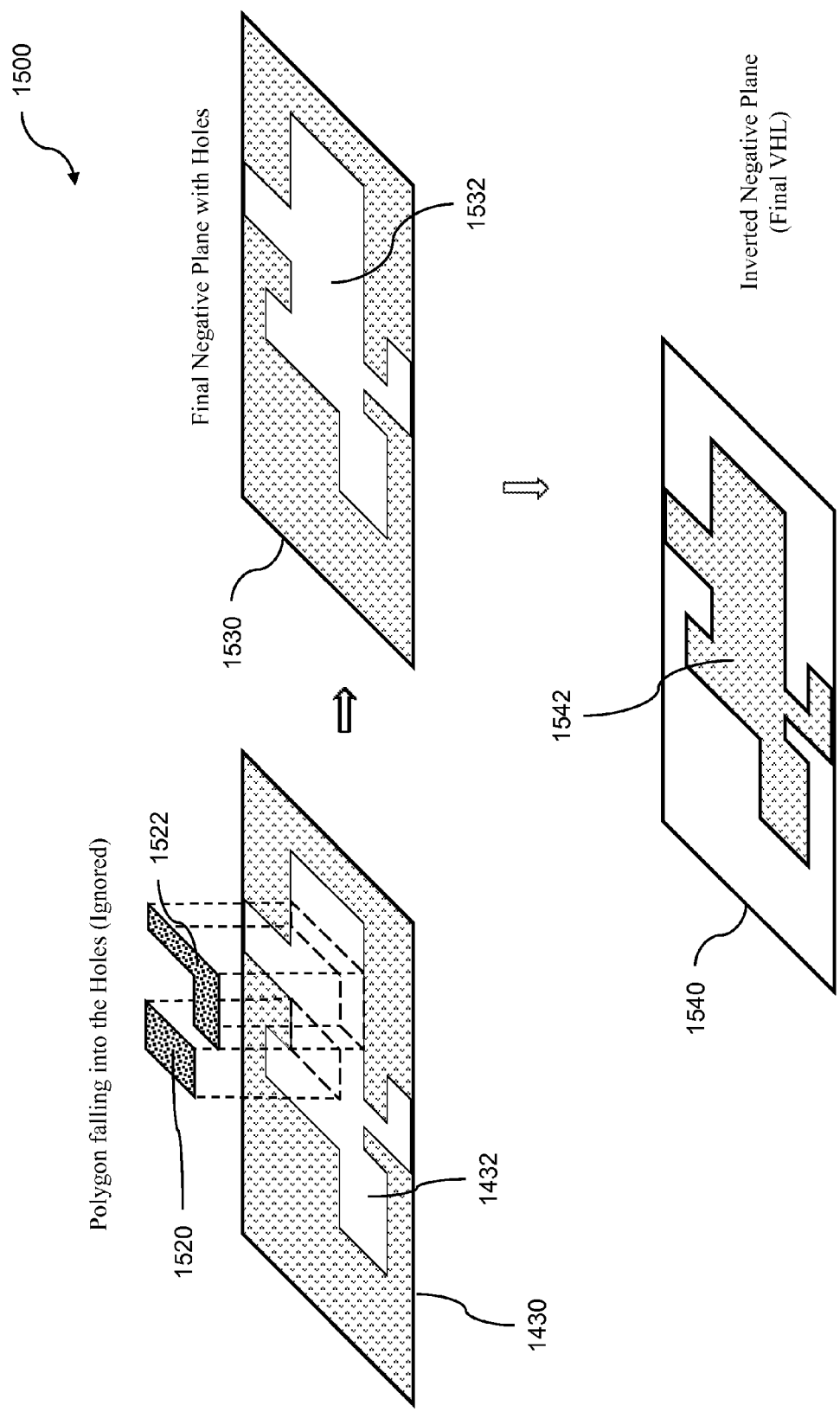
FIG. 15 shows example polygons falling into existing holes and final VHL generation.

FIGS. 13-15 show example steps involved with creating a VHL. FIG. 13 shows example steps involved in creating a VHL using a negative plane. The diagram 1300 shows the process of using a solid virtual cell plane and pushing polygons into the solid virtual cell plane. Since a negated version of the plane is used in building the solid virtual cell plane, it can also be referred to as a "negative plane." A solid virtual cell plane 1310 can be created based on a semiconductor design including a plurality of cells and a plurality of design levels. A cell can be identified in the semiconductor design and the solid virtual cell plane can be created with a boundary that corresponds to the identified cell. Polygons that overlap the cell can be determined. The polygons can be found in parent or sibling cells of the identified cell. The first polygon 1312 can be determined to be an overlapping polygon as shown in diagram 1300. The first polygon 1312 is mapped to the solid virtual cell plane 1310 in the example shown based on the polygon's position to the identified cell in the semiconductor design and then used to create a first holed solid virtual cell plane 1320 with a hole 1322 that corresponds to the polygon 1312.

A second polygon 1332 is also determined to be an overlapping polygon in the diagram 1300. The second polygon 1332 can be mapped to the holed solid virtual cell plane 1320 based on its position to the identified cell in the semiconductor design and then can be used to create a second holed solid virtual cell plane 1340 with an expanded hole 1342. The expanded hole 1342 is shaped by the merging of the first polygon 1312 and the second polygon 1332. If no other polygons are determined to be overlapping, the second holed solid virtual cell plane 1340 can be used to create a VHL for the identified cell.

FIG. 14 shows an example of pushing additional polygons in creating a VHL using a negative plane. The diagram 1400 shows a plurality of polygons 1420, 1422, 1424, and 1426, being pushed into the second holed solid virtual cell plane 1340 as shown in diagram 1300. In some embodiments, a largest contributor polygon 1422 of the plurality of polygons 1420-1426 is identified. The largest contributor polygon 1422 is a polygon that covers the most area within a solid virtual plane. The identification of the largest contributor polygon can occur over any subset of the polygons that are determined to overlap the cell, such as the overlapping polygons from a particular parent or sibling cell or over all of the polygons that overlap the cell, depending on the embodiment. In some embodiments, the largest contributor polygon 1422 is pushed into the second holed solid virtual cell plane 1340 first. In embodiments, by pushing the largest contributor polygon 1422 first, a larger hole is created earlier in the process of pushing polygons, which increases the likelihood that subsequent polygons are pushed into the hole made by the largest contributor polygon 1422, allowing the subsequent polygons to be ignored and therefore reducing processing operations. After the largest contributor polygon 1422 is pushed into the second holed solid virtual cell plane 1340, which expands the hole 1342 to create a new holed solid virtual cell plane, another polygon 1420 is pushed into the new holed virtual cell plane in the example 1400 shown, expanding the hole again. This pushing can be repeated for the rest of the plurality of polygons that were determined to overlap the cell, including the polygon 1426. Note that in the example shown 1400, the polygon 1426 only partially overlaps the cell, therefore, only the shape that corresponds to the portion of the polygon 1426 that overlaps the cell is pushed and expands the hole. The polygon 1424 fully fits into the hole 1342 so it is ignored. Once the plurality of polygons 1420-1426 have been pushed into the second holed virtual cell plane 1340, a third holed solid virtual cell plane 1430 is created using the expanded hole 1432. The expanded hole 1432 in the diagram 1400 is defined as the union of the first polygon 1312, the second polygon 1332, and the plurality of polygons 1420-1426 intersected with the original solid virtual cell plane 1310.

In yet other embodiments, methods identifying a first subset of polygons from the polygons which were pushed, wherein each polygon of the first subset of polygons has an area that exceeds a predetermined threshold, and identifying a second subset of polygons from the polygons which were pushed, wherein each polygon of the second subset of polygons has an area that is less than or equal to a predetermined threshold, are employed. For example, in an embodiment, a predetermined threshold of 2500 square nanometers is established. Polygons with an area greater than 2500 square nanometers are put into a first subset, and the remaining polygons (having an area less than or equal to 2500 square nanometers) are put into a second subset. In embodiments, the first subset is pushed first, followed by the second subset. In this way, large holes are created first, increasing the chance that following polygons may fall through one of the holes. When polygons fall through the holes, those polygons become a "don't care" condition, and thus, do not get processed, thereby saving processing resources.

FIG. 15 shows example polygons falling into existing holes and final VHL generation. Additional polygons 1520 and 1522 are determined to overlap the cell in the example shown in the diagram 1500. The additional polygons 1520 and 1522 are analyzed and found to completely fall within the expanded hole 1432 of the third holed solid virtual cell plane 1430. The falling allows the additional polygons 1520 and 1522 to be ignored as the expanded hole 1432 does not need to be further expanded to include the additional polygons 1520 and 1522, and neither needs to be changed to create the final holed solid virtual cell plane 1530 by transforming the hole 1532. The additional polygons 1520 and 1522 that fall within the existing expanded hole 1432 can be referred to as further shapes, although in some cases, further shapes can refer to the portion of polygons that fall within an existing hole.

Once the polygons 1312, 1332, 1420-1426, and 1520 and 1522 that have been determined to overlap the cell have been pushed into the solid virtual cell plane 1310, the final holed virtual cell plane 1530 has been created. The final holed virtual cell plane 1530, at this point a negative plane, can then be inverted to create a VHL 1540 for the cell with a shape 1542.

Figure 16:
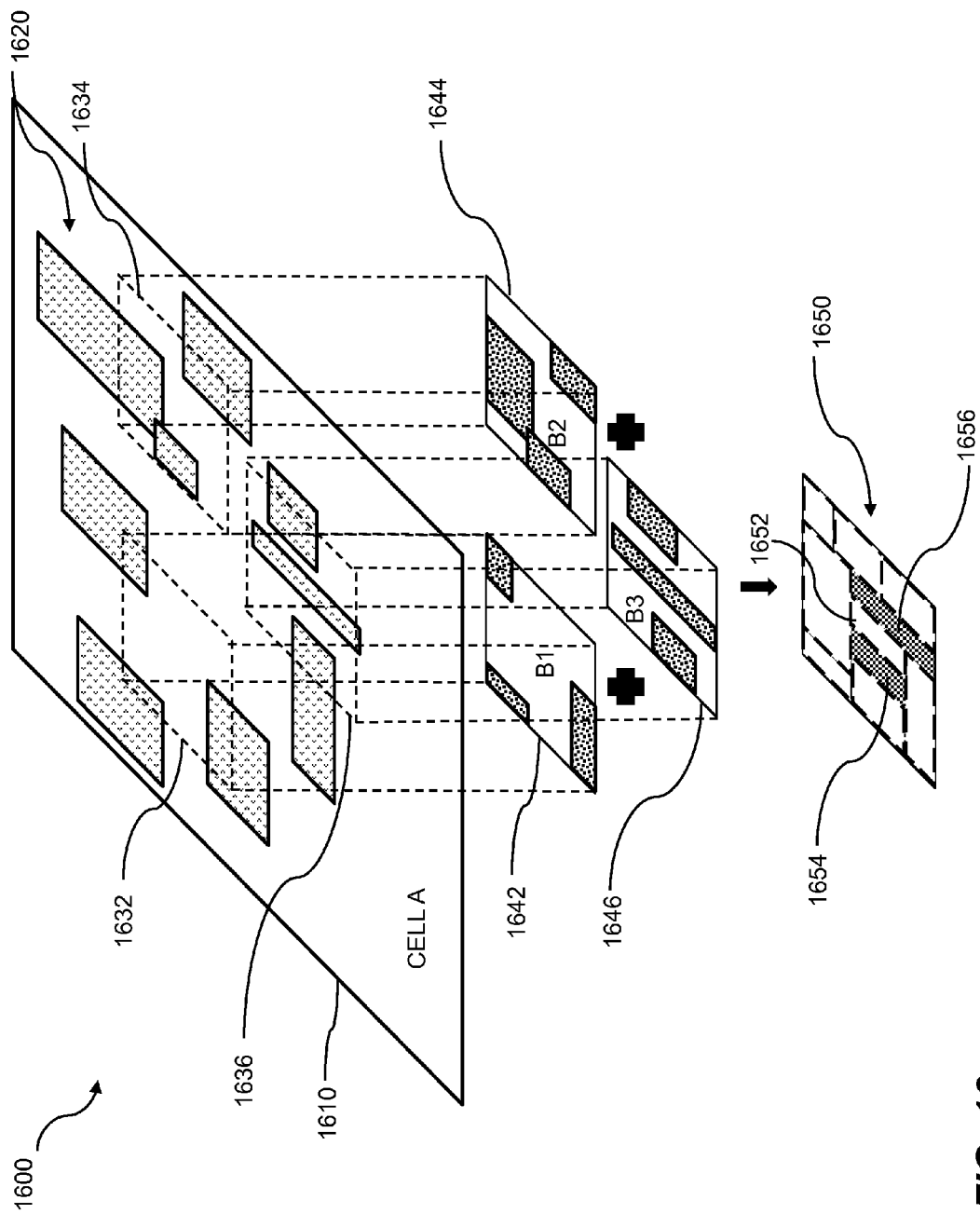
FIG. 16 shows example proximal contour manipulation.

FIG. 16 shows example proximal contour manipulation. A contour is a portion of the solid virtual cell plane that remains after holes are created. In the example shown in the diagram 1600, an instantiation 1610 of cell A includes a plurality of polygons 1620, shown lightly hatched, and three instantiations of cell B: a first instantiation 1632, a second instantiation 1634, and a third instantiation 1636. Portions of the plurality of polygons 1620 overlap the three instantiations 1632-1636 of cell B and are shown as darker hatched shapes in the first cell plane 1642, the second cell plane 1644, and the third cell plane 1646, thus representing the overlapping shapes for the first instantiation 1632, the second instantiation 1634, and the third instantiation 1636 of cell B respectively. After the overlapping shapes shown in the first cell plane 1642, the second cell plane 1644, and the third cell plane 1646 are pushed into a solid virtual cell plane having a boundary corresponding to cell B, a holed solid virtual cell plane 1650 can be created. Broken lines corresponding to the overlapping shapes are included within the holed solid virtual cell plane 1650 for reference. The holed solid virtual cell plane 1650 has a narrow portion 1652 of a hole separating a first contour 1654 and a second contour 1656. If the width of the narrow portion 1652 is less than a predetermined threshold, then the contours are considered to be proximal. Thus, embodiments include identifying a pair of proximal contours. In embodiments, the predetermined distance threshold is a constant value (e.g. 100 nanometers), or in some embodiments, is defined in terms of the ambit value (e.g. 0.5×ambit value, 1×ambit value, and so on). Thus, in embodiments, identifying a pair of proximal contours comprises identifying a pair of contours wherein each contour of the pair of contours is within a predetermined distance of each other. The proximal contours 1654 and 1656 are separated by the portion 1652 of a hole. The proximal contours 1654 and 1656 can prevent other polygons from falling through a hole, and hence, can reduce the number of shapes, i.e. polygons and portions of polygons that overlap the cell, that can be ignored. Therefore, proximal contours represent a potential waste of processing resources.

Figure 17:
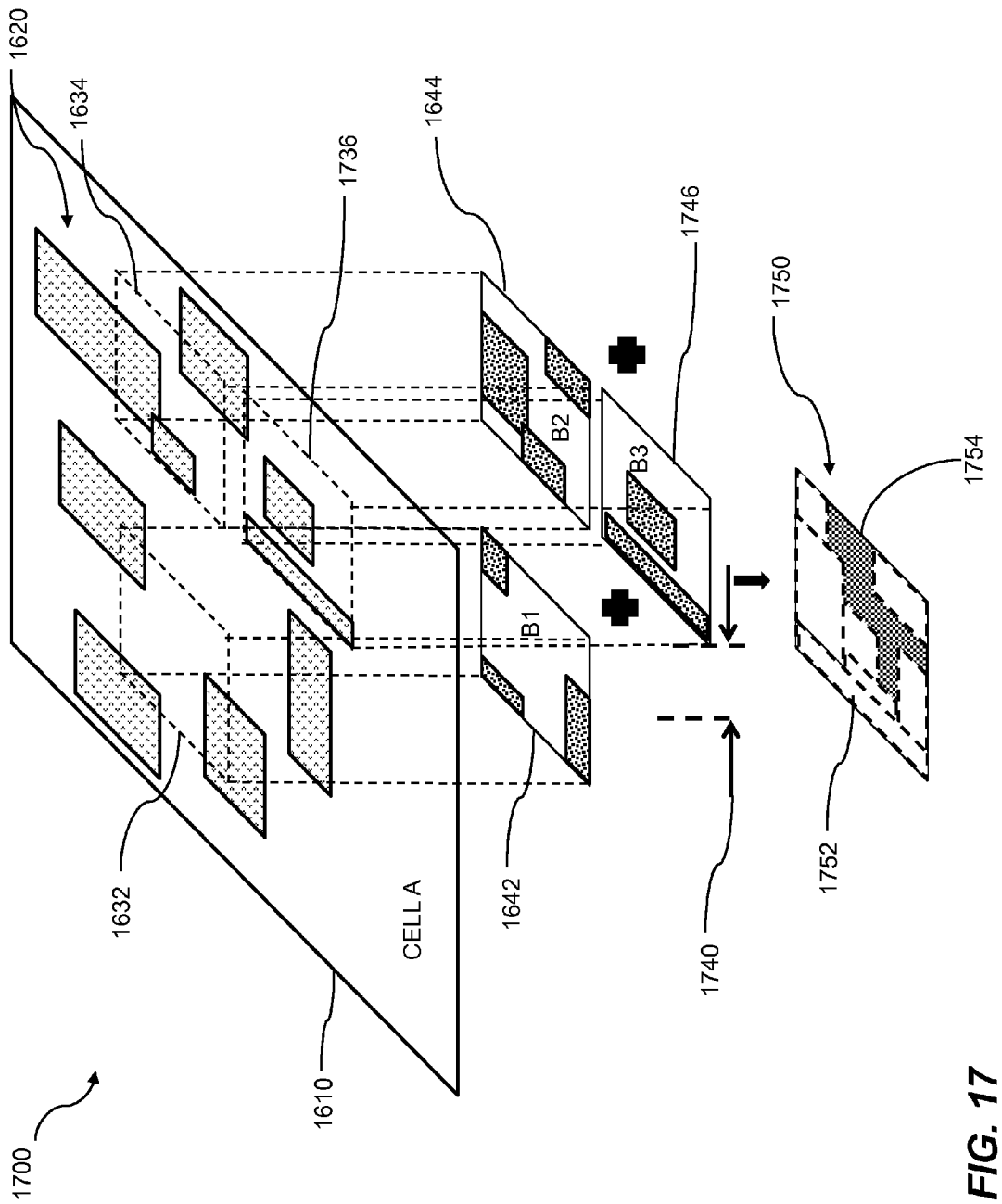
FIG. 17 shows example proximal contour joining by cell placement manipulation.

FIG. 17 shows example proximal contour joining by cell placement manipulation. Embodiments detect proximal contours in the virtual plane and attempt cell placement manipulation in order to join the proximal contours to create a larger contiguous hole. Thus, embodiments include joining the pair of proximal contours. Joining the proximal contours results in a larger contiguous hole, and is conducive to improved processing time. The example shown in diagram 1700 uses the information shown in the diagram 1600 of FIG. 16 where a pair of proximal contours 1653 and 1656 were found. The diagram 1700 shows the same instantiation 1610 of cell A with a plurality of polygons 1620, shown lightly hatched, and two identical instantiations of cell B, a first instantiation 1632, and a second instantiation 1634. The third instantiation 1736 of cell B, however, has been moved by a small distance 1740 using cell placement manipulation techniques based on the identification of the proximal contours 1654 and 1656 with the position of the third instantiation 1636 of cell B as shown in the diagram 1600. Portions of the plurality of polygons 1620 overlap the three instantiations 1632, 1634, and 1736 of cell B and are shown as darker hatched shapes in the first cell plane 1642, the second cell plane 1644, and the third cell plane 1746, representing the overlapping shapes for the first instantiation 1632, the second instantiation 1634, and the third instantiation 1736 of cell B respectively. After the overlapping shapes shown in the first cell plane 1642, the second cell plane 1644, and the third cell plane 1746 are pushed into a solid virtual cell plane having a boundary corresponding to cell B, a holed solid virtual cell plane 1750 can be created. Broken lines corresponding to the overlapping shapes are included within the holed solid virtual cell plane 1750 for reference.

In the example shown, upon detecting the pair of proximal contours (1654 and 1656 in diagram 1600), embodiments attempt to see if any manipulation of cell placement is possible in order to combine the proximal contours into a contiguous region, while still enabling the intended integrated circuit design. In the example shown, the third instantiation 1636 (as shown in diagram 1600) is moved to the right by a correction factor 1740 to a new third instantiation 1736. By moving the third instantiation 1636 (as shown in diagram 1600) slightly to create a new third instantiation 1736, the overlapping shapes in the third cell plane 1746 are moved closer to the edge of the solid virtual cell plane 1750, and the pushed polygons are now arranged in the solid virtual cell plane 1750 such that a contiguous contour 1754 is formed. Hence, proximal contours 1654 and 1656 are joined to form the contiguous contour 1754. Note that the contiguous contour may not necessarily be the same shape as the pair of joined contours. Therefore, in embodiments, joining the pair of proximal contours comprises performing a cell placement manipulation. The hole 1752 in the solid virtual cell plane 1750 is uninterrupted by separate proximal contours and thus does not have a narrow portion (e.g. narrow portion 1652 shown in diagram 1600). The hole 1752 can therefore accommodate larger polygons than before, allowing more shapes to be discarded, and thus achieving additional savings of computational resources. In embodiments, each virtual plane is analyzed with a scoring algorithm to determine if it is worthwhile to attempt cell placement manipulation. For example, a situation where the two contours of a pair of proximal contours are approximately the same size can increase the score, thus increasing the probability of the virtual plane being eligible for cell placement manipulation. A situation where one of the proximal contours is significantly larger than the other proximal contour can decrease the score, thus decreasing the probability of the virtual plane being eligible for cell placement manipulation. This scoring method is implemented because if one contour is significantly larger than the neighboring proximal contour, then the potential for a significant hole size increase by forming a contiguous contour is reduced, and thus cell manipulation can be deemed to be a waste of processing resources. Other factors can also be considered in the scoring of the virtual plane, including, but not limited to, the absolute area of each contour, the area ratio of the smaller contour to the larger contour, and the distance separating each contour of the proximal contour pair.

Figure 18:
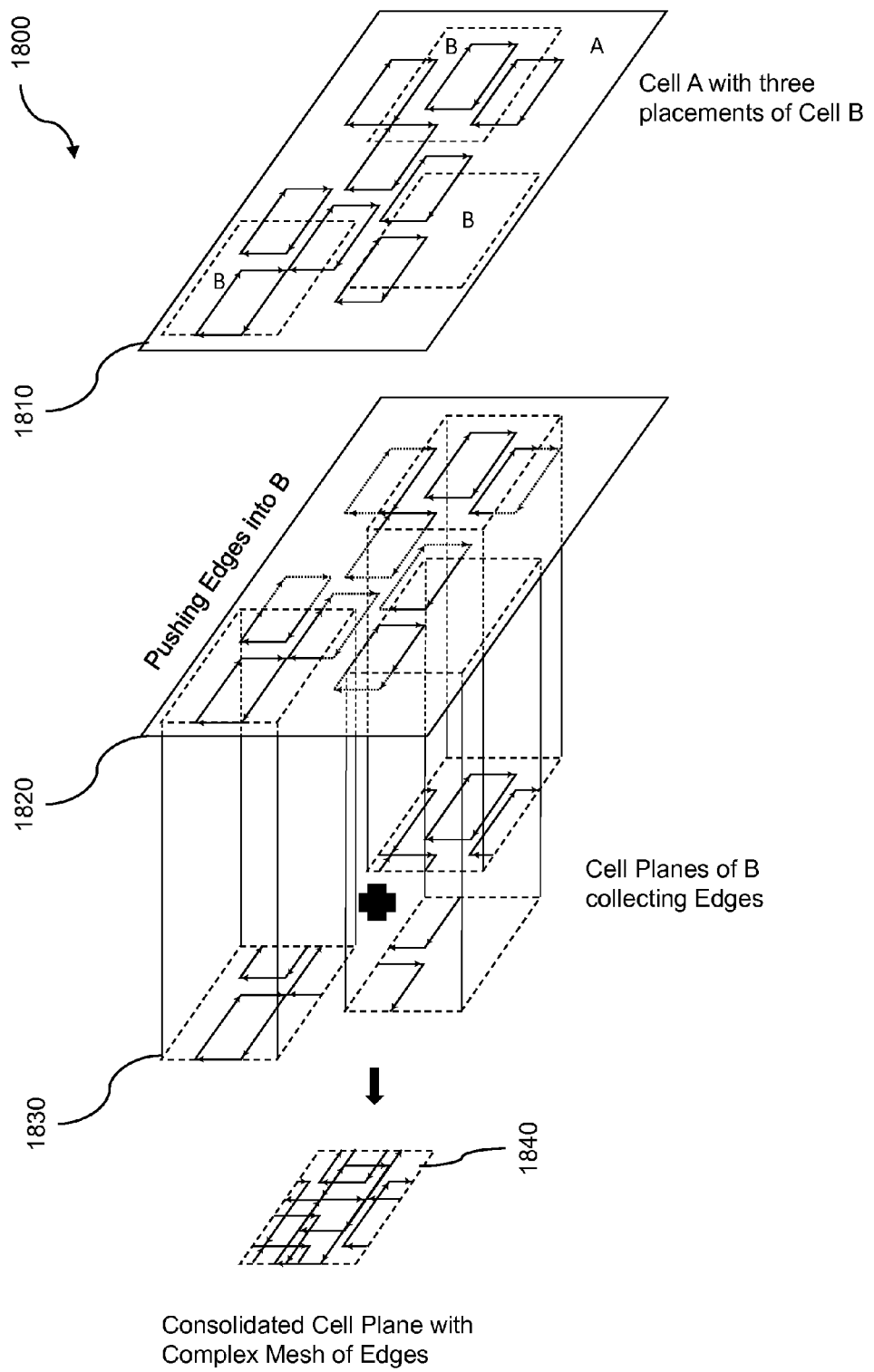
FIG. 18 shows example generation of a consolidated cell plane with a complex mesh of edges.

FIG. 18 shows example generation of a consolidated cell plane with a complex mesh of edges. The diagram 1800 shows the complexity that can be created by consolidating the edges from a plurality of polygons. The instantiation 1810 of cell A includes a plurality of polygons that are each defined by a set of edges. The instantiation 1810 of cell A also includes three instantiations of cell B. The alternate view 1820 of instantiation 1810 of cell A shows the edges of the polygons that overlap with the three instantiations of cell B using darker lines. The view 1830 shows three cell planes representing the three instantiations of cell B with the edges that overlap those instantiations. The mesh of edges 1840 shows the complexity that can be generated by combining edges that overlap the instantiations of cell B.

Figure 19:
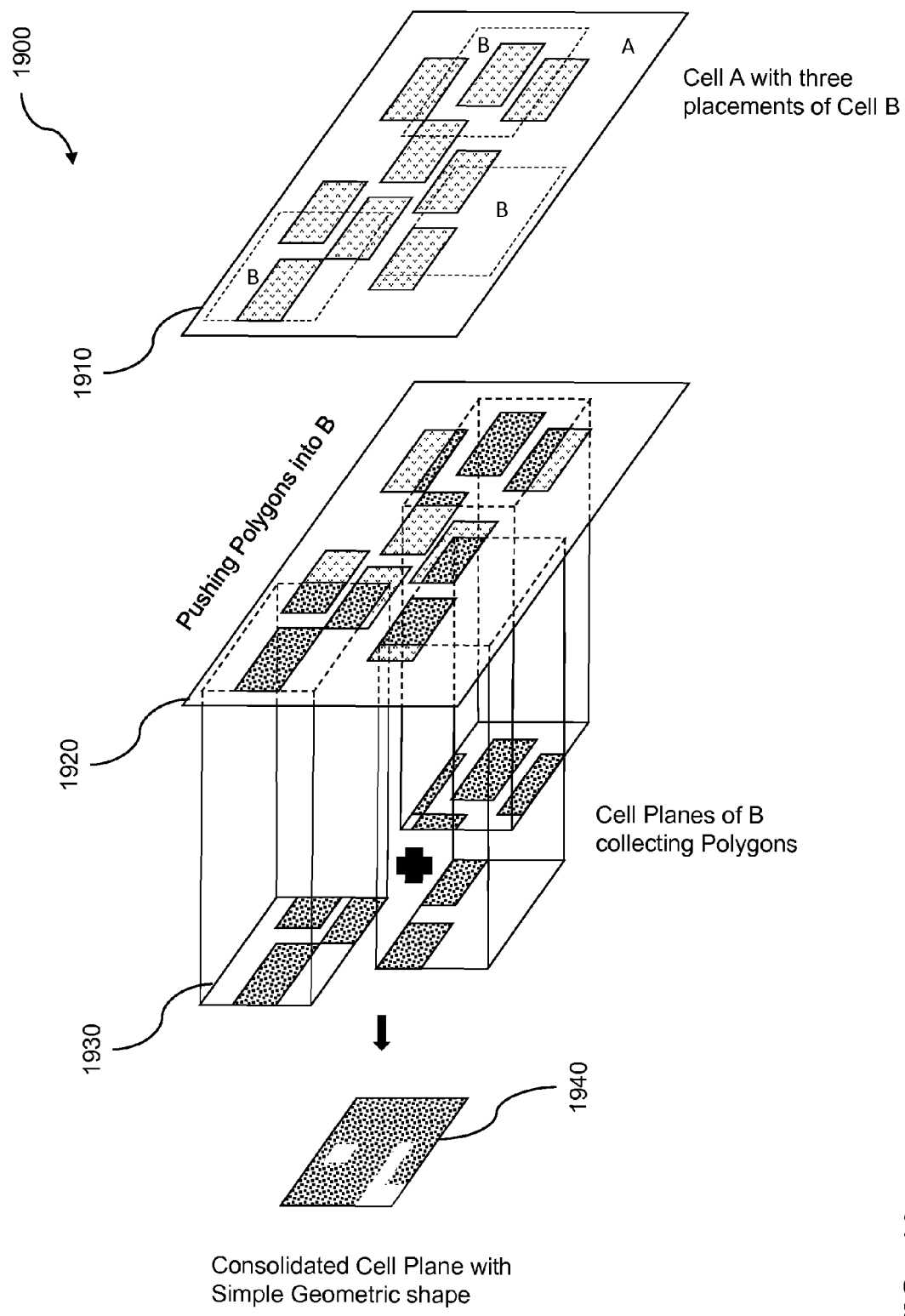
FIG. 19 shows example generation of a consolidated cell plane with simple geometric shapes.

FIG. 19 shows example generation of a consolidated cell plane with simple geometric shapes. The diagram 1900 shows the same instantiation 1910 of cell A as shown in the diagram 1800 except that the plurality of polygons are defined as areas instead of edges. The instantiation 1910 of cell A includes a plurality of polygons that are each defined as areas. The instantiation 1910 of cell A also includes three instantiations of cell B. The alternate view 1920 of instantiation 1910 of cell A shows the shapes within the polygons that overlap with the three instantiations of cell B by darker hatching. The view 1930 shows three cell planes representing the three instantiations of cell B, along with the shapes from the polygon that overlap those instantiations. The consolidated cell plane 1940 with simple geometric shapes shows that by combining the areas of the shapes, that is, performing a union of the shapes, a simpler solution than combining edges can be implemented.

Figure 20:
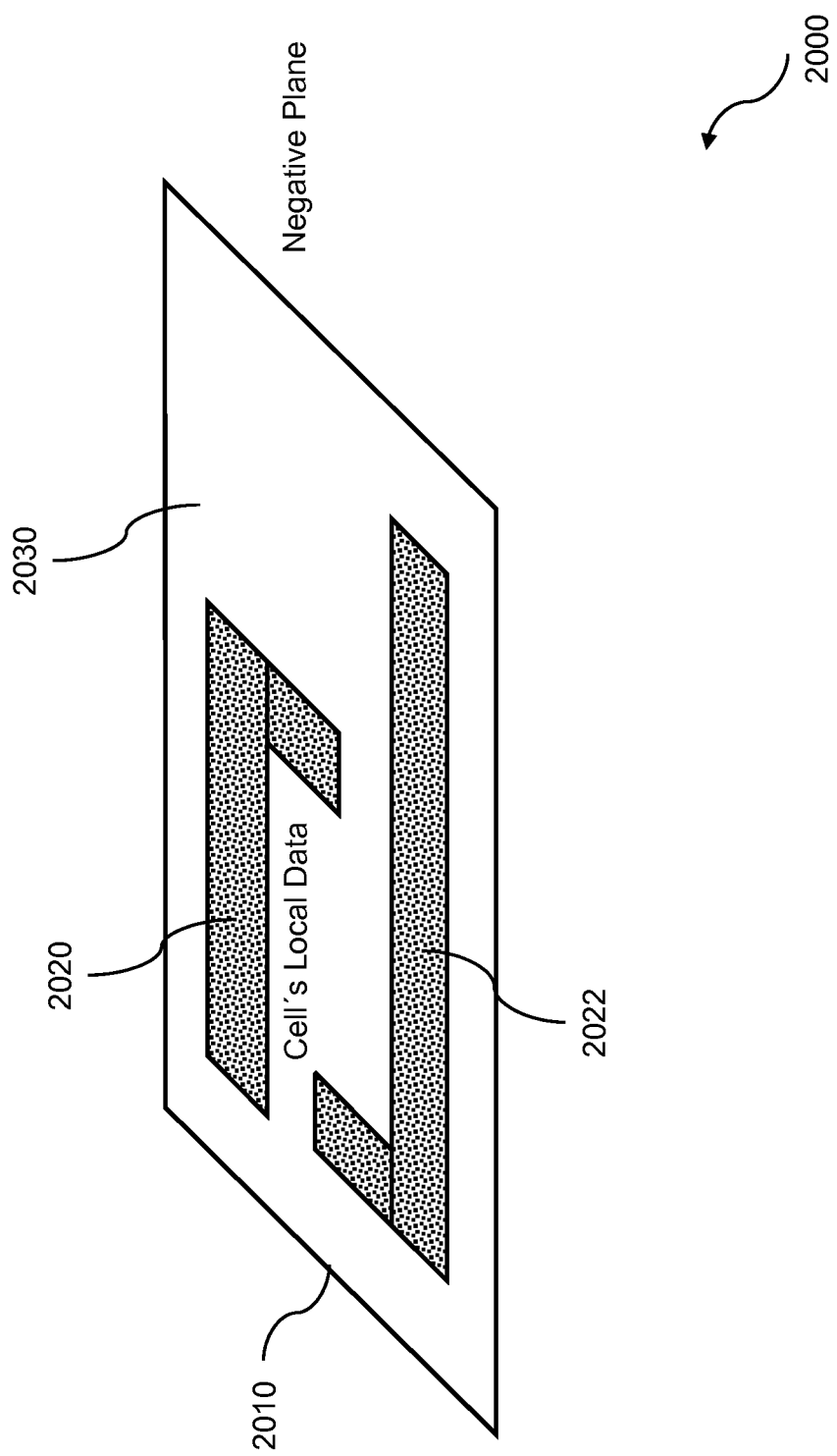
FIG. 20 shows an example cell plane prepopulated with local data.

FIG. 20 shows an example cell plane prepopulated with local data. The diagram 2000 shows a solid virtual cell plane 2010 that has been prepopulated with the local data 2020 and 2022 to create a hole 2030 through the solid virtual cell plane in all areas where the cell does not include local data. In the example shown in diagram 2000, the cell identified for creation of a VHL has two polygons included on the layer used to create the VHL. The two polygons in the local data for the cell correspond to the first polygon 2020 and the second polygon 2022. The solid virtual cell plane 2010 is then prepopulated so that contours corresponding to the cell's local data are left in the solid virtual cell plane 2010 and that all the other areas of the solid virtual cell plane 2010 are included in one or more holes, such as the hole 2030 through the solid virtual cell plane 2010. In some embodiments, the local data is oversized by a small amount before being used to create the contours in the solid virtual cell plane.

The embodiment shown manipulates the solid virtual cell plane to ignore shapes pushed from parent and sibling cells in areas that are unimportant for DRC or verification, that is, areas within the cell that do not include local shapes. First, holes are cut in a solid cell plane over areas where there is no local data. Then, by using the solid virtual cell plane prepopulated with local data to push overlapping polygons from parent and sibling cells into the plane, the algorithm is able to ignore shapes that fall in the holes, thus reducing the computational requirements. In other words, before pushing down the VHL shapes, the algorithm prepopulates the cell plane with the local data of the cell, which is oversized in some embodiments. Oversizing can account for the ambit distance that an algorithm uses while utilizing the VHL. Replacing a solid virtual cell plane with prepopulated local data is equivalent to using a negative plane with holes precut in it. If a shape from an overlapping polygon falls into a hole, it can be ignored.

Figure 21:
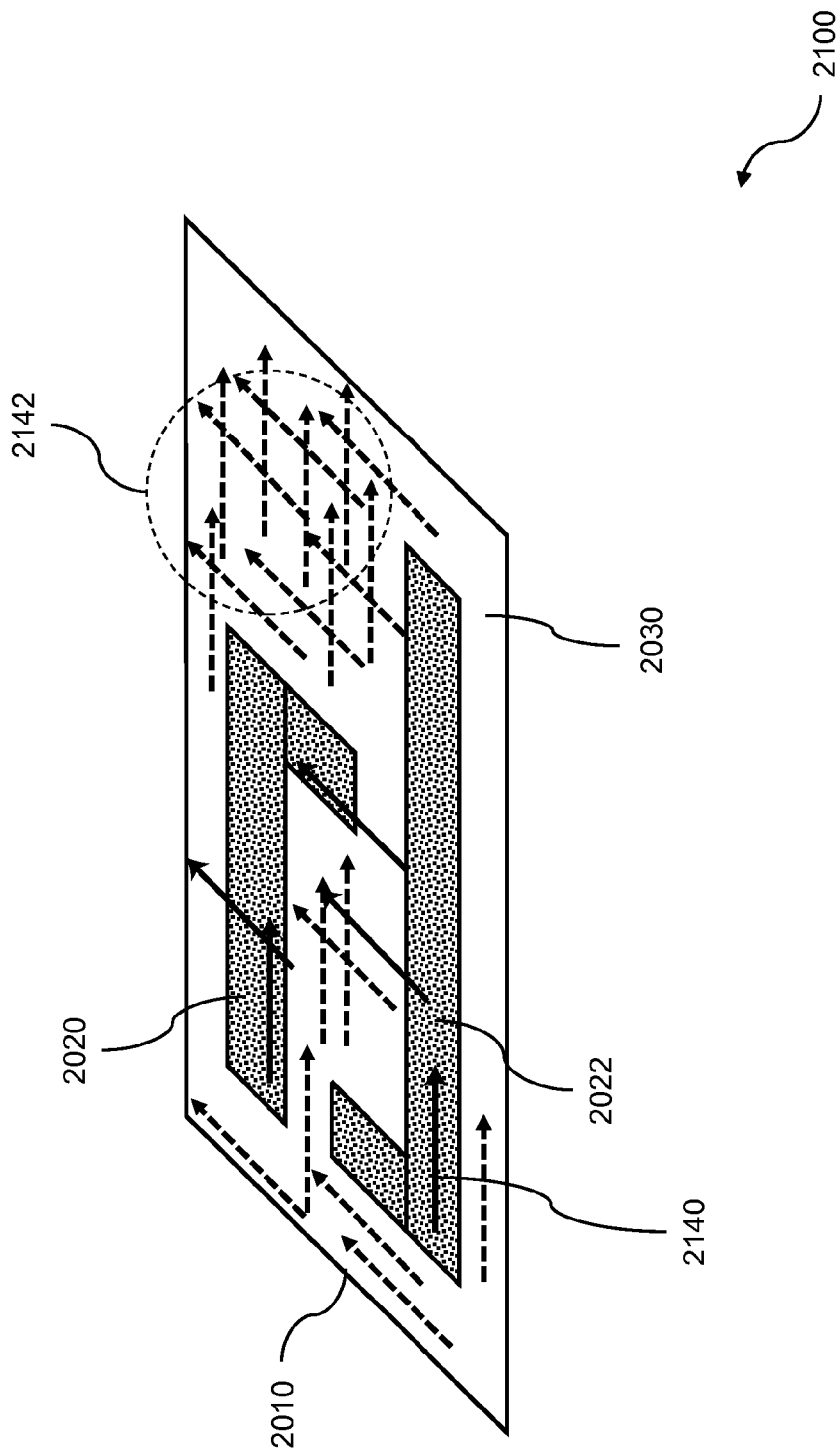
FIG. 21 shows a negative plane with edges falling into holes.

FIG. 21 shows a negative plane with edges falling into holes. A negative plane can receive edges from parent and sibling cells. Edges that fall into a hole can be ignored by embodiments, and edges that overlap the local data can be used by embodiments to create VHL data. The diagram 2100 shows the solid virtual cell plane 2010 prepopulated with local data 2020 and 2022 to create a hole 2030. The edges, such as an edge 2140 and a group of edges 2142 can be pushed into the prepopulated solid virtual cell plane 2010. The edge 2140 overlaps the shape 2022 from the local data and is retained. The edges 2142 do not overlap the local data and fall into the hole 2030 in the prepopulated solid virtual cell plane 2010. The falling through means that embodiments can ignore the edges 2142.

Figure 22:
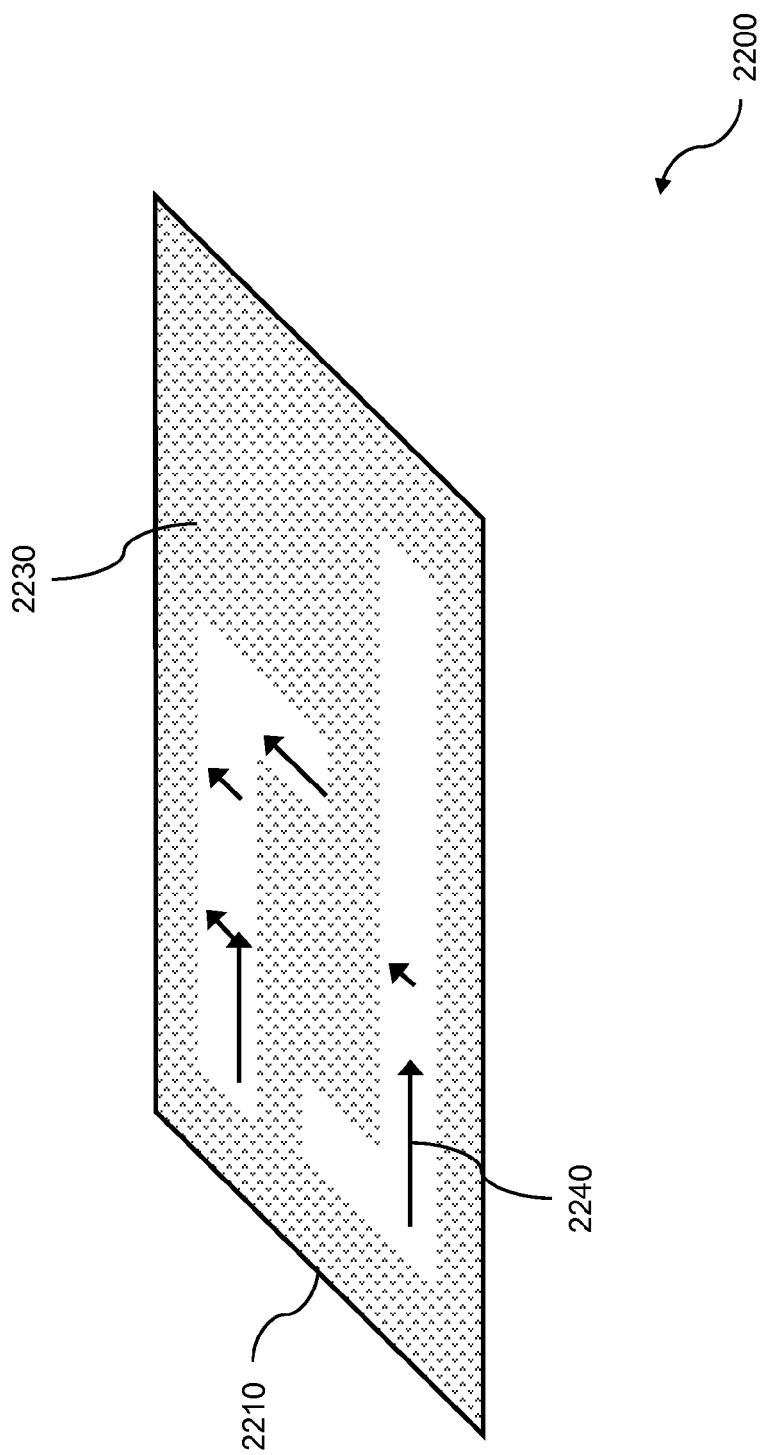
FIG. 22 shows an example of an inverted negative plane with a conservative and an actual VHL.

FIG. 22 shows an example of an inverted negative plane with a conservative and an actual VHL. The diagram 2200 shows a VHL 2210 for the identified cell. The VHL is generated by negating the prepopulated solid virtual layer 2010 of FIG. 20. Holes cut in the negated plane become VHL shapes 2230 after negating the cell plane. The geometric shapes created by the holes are called "a conservative VHL." Conservative VHL polygon shapes created due to pre-cut holes are away from local cell data and hence are ignored by the commands that use the VHL. In other words, this method pre-creates VHL polygon shapes (conservative shapes) in the cell plane and hence avoids pushing down crisscross edges in the area of the shapes. The edges that do interact with the local data of the cell, such as the edge 2240, can be retained as actual VHL data for use by various tools.

Figure 23:
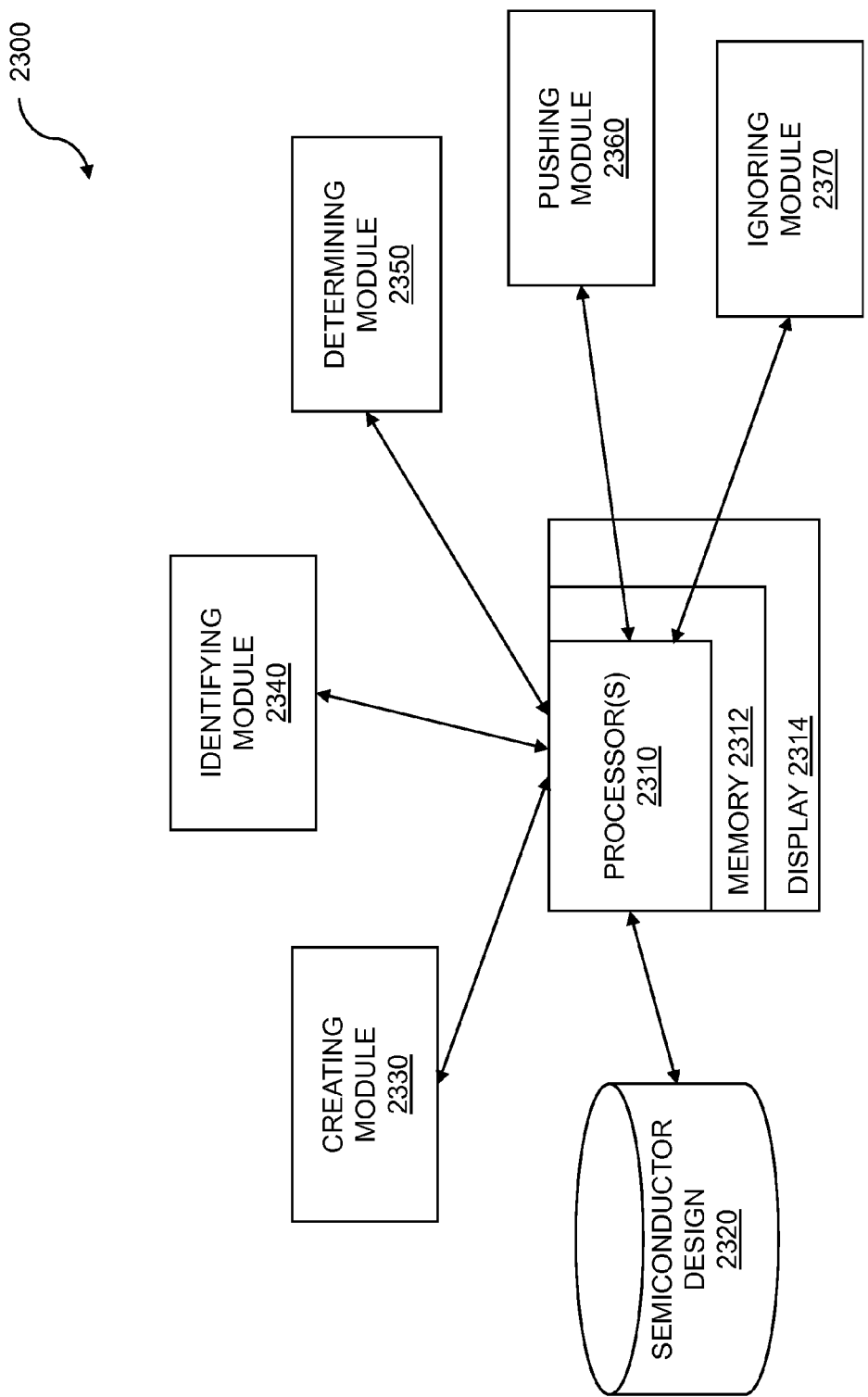
FIG. 23 is a system diagram for a negative plane VHL optimizer.

FIG. 23 is a system diagram for a negative plane VHL optimizer. The system 2300 is an embodiment of a computer system for design analysis. The system 2300 can include one or more processors 2310 which are coupled to a memory 2312. The memory 2312 can be used to temporarily or permanently store instructions, such as computer code, as well as calculated, temporary, partial, intermediate, and/or permanent computer data. The data can include any appropriate type or types of data including data for one or more semiconductor designs. The semiconductor design data can include cell information; hierarchical level information; layout information; layer information; mask information; optical information; design, configuration, and test data; test instructions; and so on. The data can include and describe various design levels. The data can include other types of data such as system support information, analysis results, etc. A display 2314 can also be present. The display 2314 can be any of a variety of electronic projectors, monitors, displays, and screens, including but not limited to, a computer display or screen, a laptop computer screen, a tablet screen, a smartphone display, a personal digital assistant (PDA) display, a handheld display, a remote display, a digital projector, or a digital television.

The system 2300 can also include a semiconductor design 2320. The semiconductor design 2320 can include a plurality of design levels. The semiconductor design 2320 can be stored in any appropriate storage device and medium including a hard disk drive (HDD), a solid-state drive (SSD), an optical disk drive (ODD), or another computer-readable storage medium. The semiconductor design 2320 can include descriptions of levels, hierarchies of levels, virtual hierarchical levels, descriptions of rectangles and polygons, and so on. The system 2300 includes a creating module 2330. The creating module 2330 can be used to create a solid virtual cell plane based on a semiconductor design including a plurality of cells and a plurality of design levels. The solid virtual cell plane can be included in a virtual hierarchical layer (VHL) cell plane for the semiconductor design 2320. The solid virtual cell plane can be a negative plane. The solid virtual cell plane can include interaction information. An identifying module 2340 can also be included in the system 2300. The identifying module 2340 can be used to identify a cell and multiple instances of the cell from the plurality of cells. The identified cell can be any of a variety of cells including analog cells, digital cells, logic cells, storage cells, processing cells, communication cells, and the like. The cell can be a parent cell, a child cell contained within a parent cell, a sibling cell to a cell contained within the parent cell, and so on. A determining module 2350 can also be included in the system 2300. The determining module 2350 can determine, for the multiple instances, polygons which overlap the cell. The polygons can be included in the design levels of the semiconductor design 2320. The polygons can include rectangles, complex polygons, and/or any other shape. The determined polygons in the design layers can connect to, can overlap, can be adjacent to, or can be near, polygons in the identified cell and instances of the cell. A pushing model 2360 can be included in the system 2300. The pushing module 2360 can push a polygon from the polygons, which were determined, into the solid virtual cell plane to create a hole in the solid virtual cell plane. The polygons which are pushed can include design level shapes which overlap the local data of the cell. In some embodiments, the polygons which are pushed can include design level shapes which are away from local data of the cell by up to an ambit value. The system 2300 can include an ignoring module 2370. The ignoring module 2370 can ignore further shapes that fall within the hole. The shapes which are pushed that fall within the holes can be ignored.

The system 2300 can include a computer program product for design analysis. The computer program product is embodied in a non-transitory computer readable medium and can comprise code for creating a solid virtual cell plane based on a semiconductor design including a plurality of cells and a plurality of design levels; code for identifying a cell and multiple instances of the cell from the plurality of cells; code for determining, for the multiple instances, polygons which overlap the cell; code for pushing a polygon from the polygons, which were determined, into the solid virtual cell plane to create a hole in the solid virtual cell plane; and code for ignoring further shapes that fall within the hole.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for analysis of a layout of a semiconductor circuit design, the method comprising:
   creating a solid virtual cell plane based on the semiconductor circuit design, said semiconductor circuit design including a plurality of cells and a plurality of design levels;
   identifying a cell from the plurality of cells, said identified cell having local data associated therewith;
   determining a plurality of polygons in the semiconductor circuit design which overlap the identified cell, said plurality of polygons being associated with a plurality of shapes of the semiconductor circuit design;
   pushing at least a first one of the plurality of polygons into the solid virtual cell plane to create a first hole in the solid virtual cell plane; and
   not processing any of a remaining ones of the plurality of polygons that fall within the first hole.

2. The method of claim 1 wherein the creating includes negating an empty cell plane.

3. The method of claim 1 further comprising pushing at least a second one of the polygons into the solid virtual cell plane to create a second hole in the solid virtual cell plane.

4. The method of claim 3, further comprising identifying a pair of proximal contours.

5. The method of claim 4, wherein the identifying a pair of proximal contours comprises identifying a pair of contours wherein each contour of the pair of contours is within a predetermined distance of each other.

6. The method of claim 5, further comprising joining the pair of proximal contours.

7. The method of claim 6, wherein the joining the pair of proximal contours comprises performing a cell placement manipulation.

8. The method of claim 3 further comprising:
   merging the first and second holes on the solid virtual cell plane.

9. The method of claim 1 further comprising:
   not processing shapes from parents and siblings to the identified cell.

10. The method of claim 1 wherein said first hole is formed in locations where there is no local data.

11. The method of claim 10 further comprising replacing the solid virtual cell plane with a plane prepopulated with the local data.

12. The method of claim 10 further comprising oversizing the local data and prepopulating the solid virtual cell plane.

13. The method of claim 12 wherein the prepopulating creates don't care areas within the solid virtual cell plane.

14. The method of claim 1 wherein said first polygon has a larger area than any one of the remaining ones of the plurality of polygons.

15. The method of claim 1, further comprising"
   identifying a first subset of polygons from the remaining ones of the plurality of polygons, wherein each polygon of the first subset of polygons has an area that exceeds a predetermined threshold, and identifying a second subset of polygons from the remaining ones of the plurality of polygons, wherein each polygon of the second subset of polygons has an area that is less than or equal to a predetermined threshold.

16. The method of claim 15 wherein the first subset of polygons is pushed prior to pushing the second subset of polygons.

17. A computer system for analysis of a layout of a semiconductor circuit design, the method comprising:
- a memory which stores instructions;
- one or more processors coupled to the memory wherein the one or more processors are configured to:
- create a solid virtual cell plane based on the semiconductor circuit design, said semiconductor circuit including a plurality of cells and a plurality of design levels;
- identify a cell from the plurality of cells, said identified cell having local data associated therewith;
- determine a plurality of polygons in the semiconductor circuit design which overlap the identified cell, said plurality of polygons being associated with a plurality of shapes of the semiconductor circuit design;
- push at least a first one of the polygons into the solid virtual cell plane to create a first hole in the solid virtual cell plane; and
- not process any of a remaining ones of the plurality of polygons that fall within the first hole.

\* \* \* \* \*

UNITED STATES PATENT AND TRADEMARK OFFICE
CERTIFICATE OF CORRECTION

PATENT NO. : 9,916,411 B2  
APPLICATION NO. : 14/713488  
DATED : March 13, 2018  
INVENTOR(S) : Gary B. Nifong et al.

It is certified that error appears in the above-identified patent and that said Letters Patent is hereby corrected as shown below:

In the Claims

In Claim 15, at Column 24, Line 59:
Delete the text "comprising"" and replace it with the text --comprising:--.

Signed and Sealed this  
Eighth Day of May, 2018

Andrei Iancu  
*Director of the United States Patent and Trademark Office*